(12) United States Patent
Kawanishi et al.

(10) Patent No.: US 7,991,298 B2
(45) Date of Patent: Aug. 2, 2011

(54) DSB-SC MODULATION SYSTEM CAPABLE OF ERASING CARRIER AND SECONDARY COMPONENT

(75) Inventors: Tetsuya Kawanishi, Tokyo (JP); Masayuki Izutsu, Tokyo (JP); Takahide Sakamoto, Tokyo (JP); Masahiro Tsuchiya, Tokyo (JP)

(73) Assignee: National Institute of Information and Communications Technology, Koganei-Shi (JP)

( * ) Notice: Subject to any disclaimer, the term of this patent is extended or adjusted under 35 U.S.C. 154(b) by 736 days.

(21) Appl. No.: 12/065,218

(22) PCT Filed: Aug. 30, 2006

(86) PCT No.: PCT/JP2006/317096
§ 371 (c)(1),
(2), (4) Date: Feb. 28, 2008

(87) PCT Pub. No.: WO2007/026757
PCT Pub. Date: Mar. 8, 2007

(65) Prior Publication Data
US 2009/0232440 A1  Sep. 17, 2009

(30) Foreign Application Priority Data
Aug. 31, 2005 (JP) ................................. 2005-250716

(51) Int. Cl.
*H04B 10/04* (2006.01)
(52) U.S. Cl. ...................... 398/186; 398/183; 398/198
(58) Field of Classification Search .................. 398/186, 398/188, 198, 183, 185; 385/2, 3, 4, 9
See application file for complete search history.

(56) References Cited

U.S. PATENT DOCUMENTS

| 6,219,469 B1 | 4/2001 | Minakata et al. |
| 2001/0008569 A1 | 7/2001 | Rangary |
| 2002/0048076 A1 | 4/2002 | Kondo et al. |
| 2002/0075546 A1* | 6/2002 | Webb ........................... 359/180 |
| 2002/0126932 A1 | 9/2002 | Minakata et al. |
| 2002/0154378 A1 | 10/2002 | Kawanishi et al. |
| 2003/0147577 A1 | 8/2003 | Kataoka et al. |

(Continued)

FOREIGN PATENT DOCUMENTS
EP  1918761  5/2008
(Continued)

OTHER PUBLICATIONS

European Search Report for European Application No. 06797069.9-1228, dated Apr. 14, 2009 (5 pages).

(Continued)

*Primary Examiner* — M. R Sedighian
(74) *Attorney, Agent, or Firm* — Osha Liang LLP

(57) ABSTRACT

It is an object of the present invention to provide an optical modulation system capable of suppressing a carrier component ($f_0$) and a high order component (such as a second order component ($f_0 \pm 2f_m$)). The optical modulation system includes Mach-Zehnder waveguide (8), a first intensity modulator (9) provided on a first arm (4), a second intensity modulator (10) provided on a second arm (5), a first main Mach-Zehnder electrode ($MZ_{CA}$ electrode) (13a), and a second main Mach-Zehnder electrode ($MZ_{CB}$ electrode) (13b). Non-desired components propagating the respective arms are made to have reverse phase before optical signals are combined, whereby the optical modulation system is capable of suppressing the non-desired components when the optical signals are combined.

10 Claims, 12 Drawing Sheets

U.S. PATENT DOCUMENTS

2008/0075470 A1    3/2008    Ohira et al.

FOREIGN PATENT DOCUMENTS

| | | |
|---|---|---|
| JP | 63-005306 | 1/1988 |
| JP | 63-013017 * | 1/1988 |
| JP | 63-13017 | 11/1994 |
| JP | 10-133159 | 5/1998 |
| JP | 11-295674 | 10/1999 |
| JP | 2000-267056 | 9/2000 |
| JP | 2002-040381 | 2/2002 |
| JP | 2002-169133 | 6/2002 |
| JP | 2002-268025 | 9/2002 |
| JP | 2003-234703 | 8/2003 |
| JP | 2004/252386 | 9/2004 |
| JP | 2004-302238 | 10/2004 |
| WO | 2006/080168 | 8/2006 |
| WO | 2007/026757 | 3/2007 |

OTHER PUBLICATIONS

Kawanishi, T., et al., "Paper Th 2.2.6: 40Gbits Versatile LiBO3 lightwave modulator," Sep. 25, 2008, Proceedings of the 31th European Conference on Optical Communication, Glasgow, GB, pp. 855-856, 2 pages.

Patent Abstract of Japan, Publication No. 2004-302238, Publication Date Oct. 28, 2009, 1 page.

International Preliminary Report and Written Opinion issued in corresponding Application No. PCT/JP2006/317096 dated Mar. 13, 2008, 8 pages.

Tetsuya Kawanishi et al., "Hikari FSK Henchoki o Mochiita Cho Koshokohi Hikari Kyodo Hencho," IEICE Technical Report, vol. 105, No. 243, Aug. 19, 2005, pp. 41-44, 4 pages.

T. Kawanishi et al., "Linear Single-Sideband Modulation for High-SNR Wavelength Conversion," IEEE Photonics Technology Letters, vol. 16, No. 6, Jun. 2004, pp. 1534-1536, 3 pages.

T. Kawanishi et al., "High-Speed Optical FSK Modulator for Optical Packet Labeling," Journal of Lightwave Technology, vol. 23, No. 1, Jan. 2005, pp. 87-94, 8 pages.

Patent Abstracts of Japan, Publication No. 2004-252386 dated Sep. 9, 2004, 2 pages.

English language abstract of Publication No. 63-005306 dated Jan. 11, 1988 from esp@cenet, 1 page.

Patent Abstracts of Japan, Publication No. 63-013017 dated Jan. 20, 1988, 1 page.

T. Kawanishi et al., "Optical frequency shifter with SSB modulator," Technical Report of IEICE, OCS2002-49, PS2002-33, OFT2002-30, Aug. 2002, 6 pages.

T. Kawanishi et al., "Optical FSK modulator using an integrated lightwave circuit consisting of four optical phase modulators," CPT-Archives, CPT Digest vol. 07, G-3, pp. 139-140, 2004, 2 pages.

Hiroshi Nishihara et al., "Optical Integrated Circuits," (revised and updated edition), Ohmsha, pp. 119-120, 4 pages, 1985.

Patent Abstracts of Japan, Publication No. 2000-267056 dated Sep. 29, 2000, 2 pages.

T. Kawanishi et al., "Resonant-type optical modulator with planar structures," Technical Report of IEICE, LQE2001-3, May 2001, 6 pages.

* cited by examiner

Fig. 1
Fig. 1A
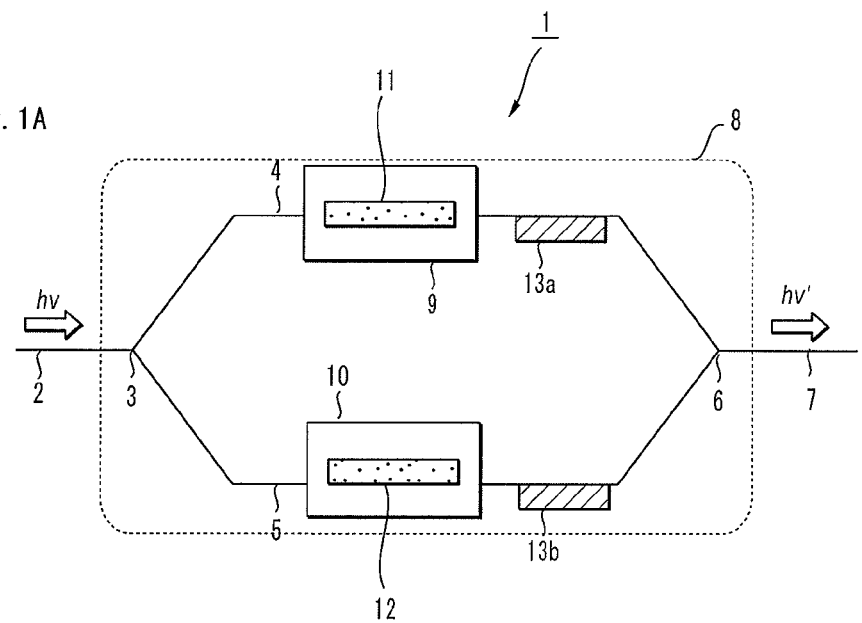
Fig. 1B
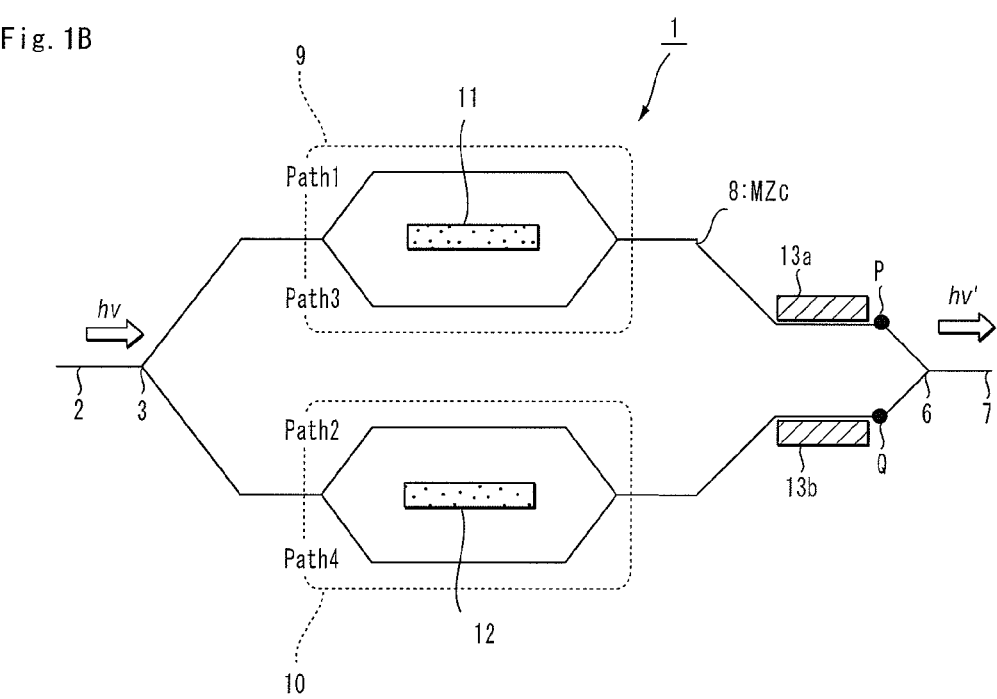

Fig. 2
Fig. 2A
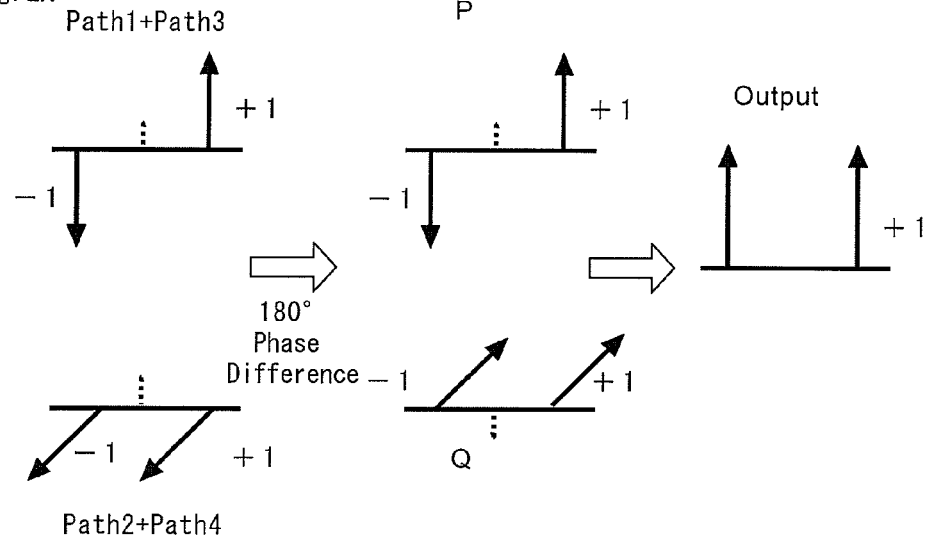
Fig. 2B
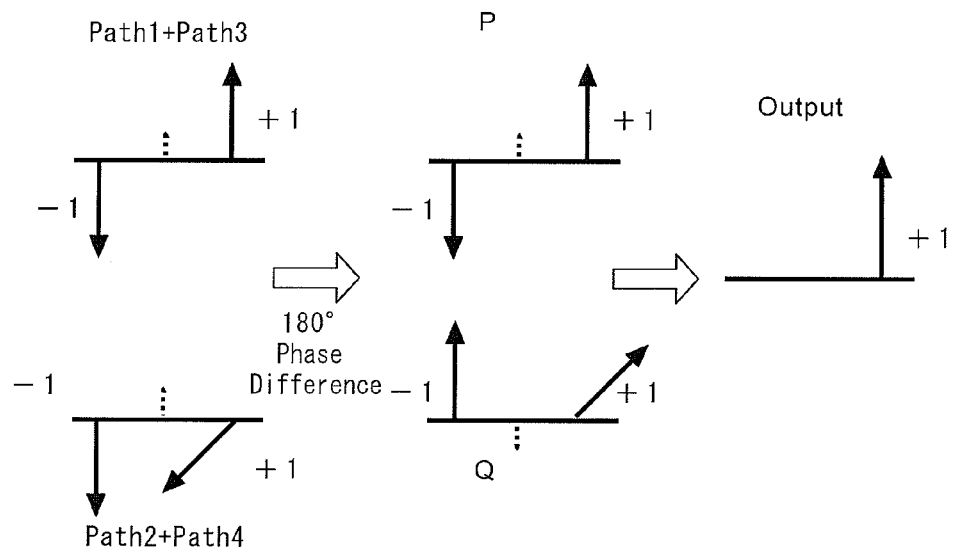

Fig. 4
Fig. 4A
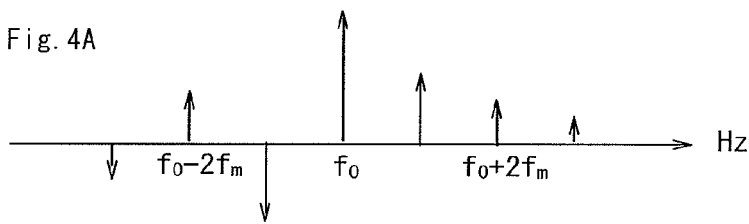
Fig. 4B
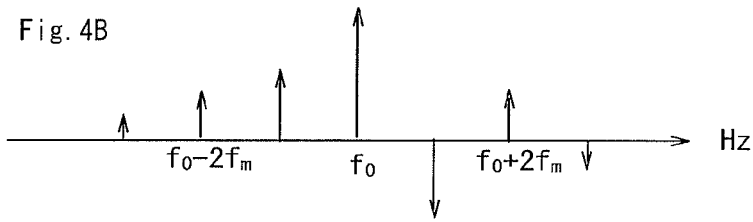
Fig. 4C
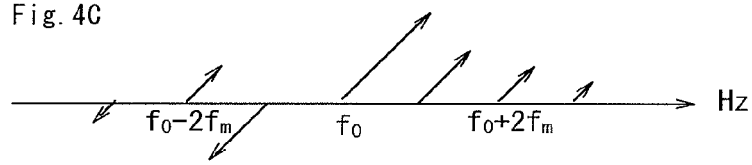
Fig. 4D
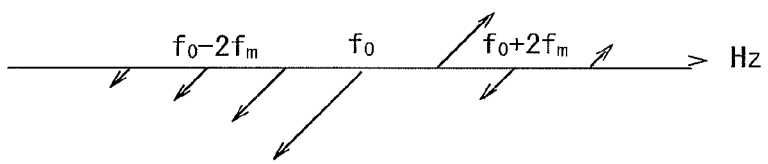
Fig. 4E
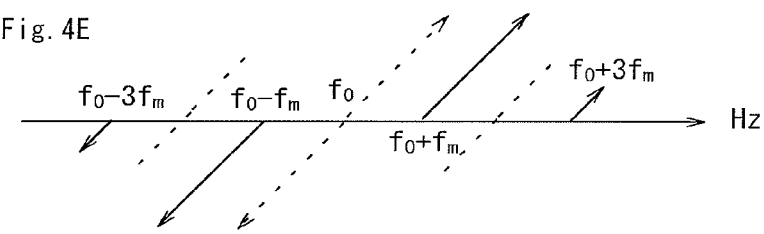
Fig. 4F
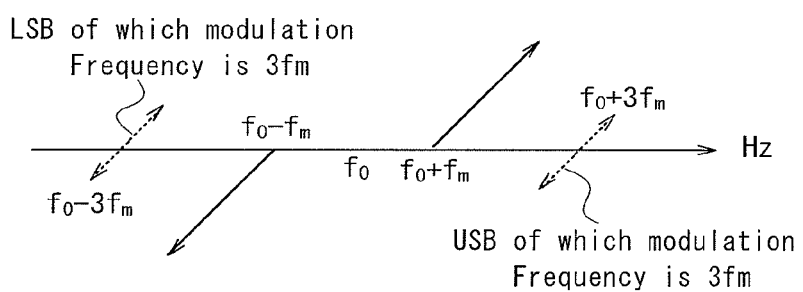

Fig. 11
Fig. 11A
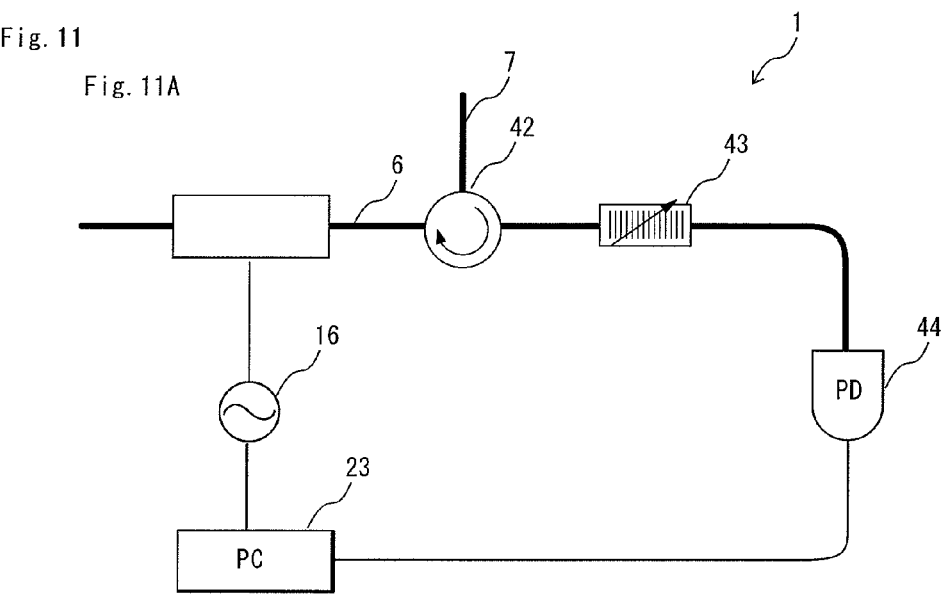
Fig. 11B
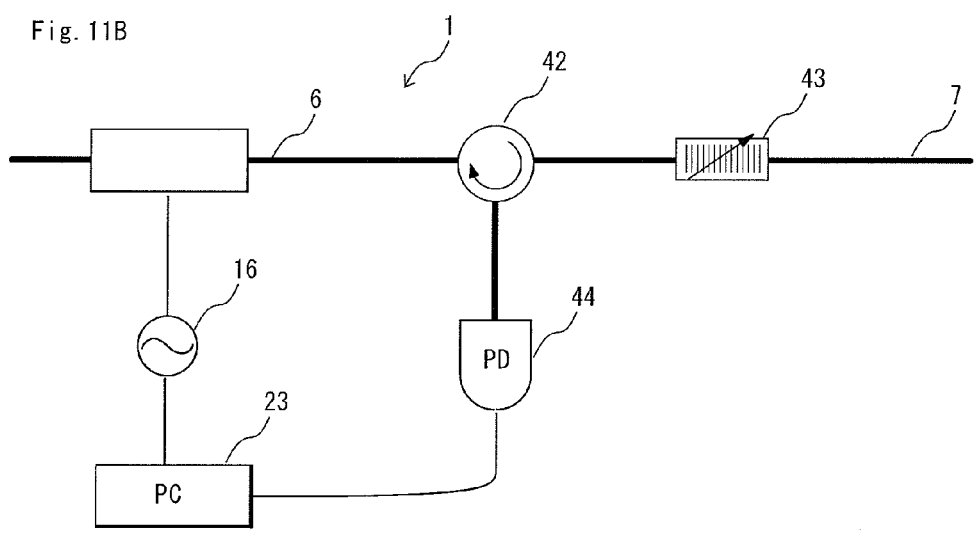

DSB-SC MODULATION SYSTEM CAPABLE OF ERASING CARRIER AND SECONDARY COMPONENT

BACKGROUND OF THE INVENTION

1. Field of the Invention

The present invention relates to an optical modulator and the like. In particular, the present invention relates to a DSB-SC modulation system capable of performing high extinction ratio modulation by suppressing a carrier component and a high order component, such as a second order component generated, when DSB modulation is performed.

2. Description of the Related Art

In optical communication, light is modulated to have information. As optical modulation, a direct modulation and an external modulation are known. The direct modulation modulates a driving power of semiconductor laser. The external modulation modulates light from semiconductor laser by means of other than light source. A modulator used in direct modulation is generally called as an optical modulator. The optical modulator modulates optical intensity, phase, etc. by causing physical changes in the optical modulator based on applied signals. The optical modulator has technical problems that it is difficult to attain reduction of driving voltage, realization of a higher extinction ratio for improving modulation efficiency, widening a bandwidth, and improvement of high light utilization efficiency for speeding up and loss reduction of a modulation. In other words, development of a modulator having high extinction ratio is desired. It is to be noted that the extinction ratio is a ratio of optical intensity of the highest level to the lowest level.

An optical signal side-band (optical SSB) modulator is a modulator which shifts frequency of an optical signal and outputs the optical signal [Tetsuya Kawanishi and Masayuki Izutsu, "Optical frequency shifter using optical SSB modulator", TECHNICAL REPORT OF IFICE, OCS2002-49, PS2002-33, OFT2002-30 (2002-08)].

An optical FSK modulator which is a modification of an optical SSB modulator is also known [Tetsuya Kawanishi and Masayuki Izutsu, "Optical FSK modulator using an integrated light wave circuit consisting of four optical phase modulator", CPT 200407-2, Tokyo, Japan, 14-16 Jan. 2004] [Tetsuya Kawanishi, et al. "Analysis and application of FSK/IM simultaneous modulation" Tech. Rep. of IEICE. EMD 2004-47, CPM 2004-73, OPE 2004-130, LQE 2004-45 (2004-08), pp. 41-46].

FIG. 9 is a schematic diagram showing a basic arrangement of a conventional optical modulation system acting as an optical SSB modulator or an optical FSK modulator. As shown in FIG. 9, this optical modulation system comprises a first sub Mach-Zehnder waveguide ($MZ_A$) (2), a second sub Mach-Zehnder waveguide ($MZ_B$) (3), a main Mach-Zehnder waveguide ($MZ_C$) (8), a first electrode ($RF_A$ electrode) (9), a second electrode ($RF_B$ electrode) (10), and a modulation electrode.

The main Mach-Zehnder waveguide ($MZ_C$) (8) includes an input part (4) of an optical signal, a branching part (5) where the optical signal is branched to the first sub Mach-Zehnder waveguide ($MZ_A$) and the second sub Mach-Zehnder waveguide ($MZ_B$), the first sub Mach-Zehnder waveguide ($MZ_A$), the second sub Mach-Zehnder waveguide ($MZ_B$), a multiplexing part (6) multiplexing the optical signal outputted from the first sub Mach-Zehnder waveguide ($MZ_A$) and the second sub Mach-Zehnder waveguide ($MZ_B$), an output part (7) outputting the optical signal multiplexed by the multiplexing part.

The first electrode ($RF_A$ electrode) (9) inputs radio frequency (RF) signals to two arms comprising the first sub Mach-Zehnder waveguide ($MZ_A$).

The second electrode ($RF_B$ electrode) (10) inputs radio frequency (RF) signals to two arms comprising the second sub Mach-Zehnder waveguide ($MZ_B$).

The modulation electrode is provided on the main Mach-Zehnder waveguide.

Changing USB and LSB, which can be used as information, are attained by means of electrode of the main Mach-Zehnder waveguide; thereby frequency shift keying is realized.

As an optical modulator, an optical double side-band suppressed carrier (DSB-SC) modulator is publicly known. The above described optical modulation system also acts as a DSB-SC modulator. The DSB-SC modulator ideally outputs two side bands, suppressing carrier components. However, in reality, in an output of a DSB-SC modulator shown in the figure below, unsuppressed carrier component ($f_0$) and a high order component (e.g. a second order component ($f_0 \pm 2f_m$)) remain, preventing extinction ratio from improving.

For example, a DSB-SC modulator having a Mach-Zehnder, PMs provided on both arms of the Mach-Zehnder and a fixed phase shifter provided on one arm of the Mach-Zehnder is disclosed in FIG. 37 of Japanese Unexamined Patent Application Publication No. 2004-252386. An optical DSB-SC modulator ideally outputs two sideband (double sideband) signals, thereby suppressing carrier signal components. However, odd order components remain slightly. As such a remaining component, a third order component is theoretically considered to be the strongest.

It is an object of the present invention to provide a new optical modulation system.

It is an object of the present invention to provide a DSB-SC modulation system which is capable of suppressing a carrier component ($f_0$) and a high order component (such as a second order component ($f_0 \pm 2f_m$)).

SUMMARY OF THE INVENTION

In the optical modulation system of the present invention, two electrodes are provided along the main Mach-Zehnder waveguide ($MZ_C$) in contrast to the conventional optical modulation system which has one electrode provided along the main Mach-Zehnder waveguide ($MZ_C$). This arrangement enables to adjust phases of the output signals from the each sub Mach-Zehnder respectively.

The present invention is based on the following idea. The above arrangement of the optical modulator enables to adjust phases of the output signals from the each sub Mach-Zehnder respectively, thereby effectively suppressing a carrier component ($f_0$) and a high order component (especially, a second order component).

In particular, this invention basically relates to an optical modulator which comprises: a Mach-Zehnder waveguide (8) which includes an input part (2) of an optical signal, a branching part (3) where the optical signal is branched, a first arm (4) which is configured to act as a waveguide, wherein one of the optical signal branched from the branching part (3) propagates though the first arm, a second arm (5) which is configured to act as a waveguide, wherein the remaining optical signal branched from the branching part (3) propagates though the second arm, a combining part (6) which combines the optical signals outputted from the first arm (4) and the second arm (5), and an output part (7) which outputs the optical signal which has combined at the combining part (6); a first intensity modulator (9) provided on the first arm (4), the first intensity modulator controls amplitude of the optical signal propagating through the first arm (4); a second intensity modulator (10) provided on the second arm (5), the second intensity modulator controls amplitude of the optical signal propagating through the second arm (5); a first electrode (electrode A) (11) of the first intensity modulator (9); a second electrode (electrode B) (12) of the second intensity modulator (10); a first main Mach-Zehnder electrode ($MZ_{CA}$ electrode) (13a) provided along at least a part of a waveguide portion between an output part of the first intensity modulator (9) and the combining part; and a second main Mach-Zehnder electrode ($MZ_{CB}$ electrode) (13b) provided along at least a part of a waveguide portion between an output part of the second intensity modulator (10) and the combining part.

As shown in the above arrangement, since the optical modulator comprises the first main Mach-Zehnder electrode ($MZ_{CA}$ electrode) and the second main Mach-Zehnder electrode ($MZ_{CB}$ electrode) (in other words, the optical modulator has two main Mach-Zehnder electrodes (electrode C)), phases of the output signals from the each sub Mach-Zehnder waveguide can be adjusted respectively, and components to be suppressed can be effectively suppressed by combining the output signals after having reversed the phases of the components to be suppressed outputted from the each sub Mach-Zehnder waveguide.

As above explained, in DSB-SC modulation, odd order components remain theoretically. A third order component, for example, is considered to lower the extinction ratio. However, the system of the present invention focuses on a carrier component and a second order component, which do not remain theoretically, and effectively suppresses these components (Of course, the system of the present invention is able to suppress the third order component as well). In other words, components to be suppressed can be effectively suppressed by controlling the output signals from the two sub Mach-Zehnder waveguides so that the phases of the components to be suppressed are reversed.

The other aspect of the present invention relates to a method for generating an optical modulation signal by using the above system. This is an optical modulation method for controlling the phases of output signals outputted from the first sub Mach-Zehnder waveguide ($MZ_A$) and the second sub Mach-Zehnder waveguide ($MZ_B$) before the output signals are combined at the combining part so that the phases of components to be suppressed is reversed.

The phases of the output signals, which are outputted from the first sub Mach-Zehnder waveguide ($MZ_A$) and the second sub Mach-Zehnder waveguide ($MZ_B$) before combined at the combining part, are controlled so that the phases of the components to be suppressed are reversed. Therefore, the components to be suppressed cancel each other when the signals are combined at the combining part, thereby realizing the high extinction ratio.

The preferable embodiment of the second aspect of the present invention is the above described optical modulation method comprising the steps of:

(i) adjusting bias voltage applied to the main Mach-Zehnder waveguide ($MZ_C$) and bias voltage applied to the first sub Mach-Zehnder waveguide ($MZ_A$) and the second Mach-Zehnder waveguide ($MZ_B$) so as to increase output from the main Mach-Zehnder waveguide ($MZ_C$);

(ii) adjusting bias voltage applied to the main Mach-Zehnder waveguide ($MZ_C$) so as to decrease output from the main Mach-Zehnder waveguide ($MZ_C$);

(iii) decreasing bias voltage of the first sub Mach-Zehnder waveguide ($MZ_A$) or the second sub Mach-Zehnder waveguide ($MZ_B$) so as to decrease output from the main Mach-Zehnder waveguide ($MZ_C$); and (iv) adjusting bias voltage applied to the main Mach-Zehnder waveguide ($MZ_C$) so as to decrease output from the main Mach-Zehnder waveguide ($MZ_C$).

In this bias adjustment, for example, a bias signal source is preferably controlled automatically by the optical modulation system which includes a control part controlling bias signal source in the above steps.

By using the bias voltage adjusted in this way, in other words, by using a signal with relatively less carrier components or relatively less high order components, these components are suppressed by the method above explained. Therefore, the components to be suppressed can be suppressed more effectively.

The preferable embodiment of the present invention is one of the optical modulation systems described above, wherein the first main Mach-Zehnder electrode ($MZ_{CA}$ electrode) and the second main Mach-Zehnder electrode ($MZ_{CB}$ electrode) make the respective waveguide portions, where these electrodes are provided, act as optical phase modulators. Since the waveguide portions including each electrodes act as optical phase modulators, the phases of the optical signals propagating through the respective waveguide can be effectively adjusted.

The preferable embodiment of the present invention is one of the optical modulation systems described above which further comprises a control part for adjusting modulation time of an $RF_A$ signal, an $RF_B$ signal, a modulation signal applied to the first main Mach-Zehnder electrode ($MZ_{CA}$ electrode), and a modulation signal applied to the second main Mach-Zehnder electrode ($MZ_{CB}$ electrode), wherein the $RF_A$ signal is a radio frequency signal applied to the optical signal, the optical signal propagating through two arms composing the first sub Mach-Zehnder waveguide ($MZ_A$), and the $RF_B$ signal is a radio frequency signal applied to the optical signal, the optical signal propagating through two arms composing the second sub Mach-Zehnder waveguide ($MZ_B$).

The preferable embodiment of the present invention is one of the optical modulation systems described above which further comprises a control part for adjusting voltage applied to the first main Mach-Zehnder electrode ($MZ_{CA}$ electrode) and the second main Mach-Zehnder electrode ($MZ_{CB}$ electrode), wherein the voltage is adjusted so that phase difference of optical carrier signals or certain high order optical signals become 180 degrees, and the optical carrier signals or the certain high order optical signals are contained in output signals from the first intensity modulator (9) and output signals from the second intensity modulator (10).

By adjusting the components to be suppressed of the optical signals so that the phases are reversed, the non-desired components can be suppressed effectively. In particular, an output light is detected by a photodetector, intensity of components to be suppressed of the output light is derived by the control part, and the output signal outputted from the signal source is adjusted by the control part so that the intensity of the components to be suppressed is decreased.

A preferable embodiment of the present invention is one of the optical modulation systems above described which acts as an optical carrier suppressed double side band modulator (DSB-SC modulator). The present invention was originally made in a process of improving a DSB-SC modulator. Therefore, the system of the present invention can be effectively used as a DSB-SC modulator.

The other preferable aspect of the present invention is one of the optical modulation systems described above further comprising: a signal source part (16) including: the first electrode (electrode A) (11); the second electrode (electrode B) (12); a first signal source (14) for supplying bias voltage, the bias voltage being applied to the $MZ_{CA}$ electrode and the $MZ_{CB}$ electrode; and a second signal source (high frequency signal source) (15) for supplying a radio frequency signal to the $MZ_{CA}$ electrode and the $MZ_{CB}$ electrode, wherein the second signal source (high frequency signal source) (15) includes: a third harmonic signal generator (17) for generating an electric signal ($3f_m$) whose frequency is three times the frequency of a basic signal ($f_m$); a phase adjusting part (18) for adjusting a phase difference between a phase of the basic signal ($f_m$) and a phase of the electric signal ($3f_m$), wherein the basic signal ($f_m$) is outputted from the second signal source (high frequency signal source) (15), the electric signal ($3f_m$) is outputted from the third harmonic signal generator (17), and the electric signal ($3f_m$) has frequency three times the frequency of the basic signal ($f_m$); and a signal intensity adjusting part (19) for adjusting intensity of the basic signal ($f_m$) or the electric signal ($3f_m$), wherein the basic signal ($f_m$) is outputted from the second signal source (high frequency signal source) (15), the electric signal ($3f_m$) is generated from the third harmonic signal generator (17), and the electric signal ($3f_m$) has a frequency three times the frequency of the basic signal ($f_m$).

The first order component ($f_0 \pm 3f_m$) is generated by applying a signal ($3f_m$) as a modulation signal. And the third order component ($f_0 + 3f_m$) is generated by applying a basic signal ($f_m$) as a modulation signal. In the optical modulation such as the DSB-SC modulation, by adjusting the first order component and the third order component to have reversed phase and the same intensity level, these two components cancel each other and optical modulation such as a DSB-SC modulation with high extinction ratio can be realized.

In other words, the third harmonic signal generator (17) generates a third harmonic signal ($3f_m$) which has a frequency three times of the frequency of the basic signal ($f_m$). And the phase modulator (18) adjusts phase difference between the phase of the basic signal ($f_m$) and the phase of the electric signal ($3f_m$). The basic signal ($f_m$) is outputted form the second signal source (high frequency signal source) (15). The signal intensity adjusting part (19) adjusts the electric signal ($3f_m$). And the third harmonic signal, whose frequency ($3f_m$) is three times the frequency of the basic signal ($f_m$), is applied to the electrode. Since the third harmonic signal have been adjusted so that its first order component ($f_0 \pm 3f_m$) and the above mentioned third order component have reversed phase and about the same intensity level, these two components suppresses each other, and optical modulation such as a DSB-SC modulation with high extinction ratio can be realized.

A preferable embodiment of the present invention is one of the optical modulation systems (1) above described
wherein the first intensity modulator (9) is a first Mach-Zehnder waveguide including the first electrode (electrode A) (11), and the second intensity modulator (10) is a second Mach-Zehnder waveguide including the second electrode (electrode B) (12). The optical modulation system of this embodiment can adopt a publicly known optical modulators as an optical SSB modulator or an optical FSK modulator.

A preferable embodiment of the present invention is one of the optical modulation systems (1) above described which further comprises
either one or both of an optical intensity compensation mechanism (31) and an optical intensity compensation mechanism (32), wherein the optical intensity compensation mechanism (31) is provided along the first arm (4) between the first intensity modulator (9) and the combining part (6), and the optical intensity compensation mechanism (32) is provided along the second arm (5) between the second intensity modulator (10) and the combining part (6).

Since the optical modulation system comprises the optical intensity compensation mechanism (e.g. intensity modulator), the optical modulation system is able to adjust the intensities of components to be suppressed to the same level effectively. Therefore, by adjusting the non-desired components to have reversed phases, these components can be effectively suppressed.

The other aspect of the present invention is the optical modulation system which comprises: either one of the above optical modulation system acting as an optical modulator; either one or both of a phase modulator and an intensity modulator for modulating output light from the optical modulator or input light to the optical modulator; and a control part for adjusting modulation time of a modulation signal of the optical modulator and a modulation signal of the phase modulator or the intensity modulator.

This optical modulation system relates to the optical modulation, the optical modulation system, and the like. The optical modulation system comprises a phase and intensity modulator (specifically, two-electrode MZ type modulator) modulating an output light from the optical modulator or an input light to the optical modulator.

There remain unsuppressed carrier components in an output of the optical modulation. These unsuppressed carrier components prevent extinction ratio from improving. However, a high extinction ratio modulation can be realized by performing a phase modulation and/or an intensity modulation to the output light from the optical modulator, or by performing a modulation to an input light to the optical modulator so that the unsuppressed components are suppressed. In this process, phase and timing are adjusted so that sidebands offset from the corresponding first sidebands (whose frequency is equal to that of a carrier or a high order component) cancel carrier components (or high order components). Thus, carrier components (or high order components) can be suppressed, thereby realizing an optical modulation system which can perform high extinction ratio modulation.

The optical modulation system according to this aspect of the invention operates as follows.

The optical modulator outputs double side band signals. Then, the phase modulator or the intensity modulator modulates either one or both of the double side band signals, and the other double side band signals are generated. The control part controls so that a frequency of either one of the double side band signals become equal to a frequency of an optical carrier signal or a high order optical signal of output light from the optical modulator, and the optical carrier signal or the high order optical signal is cancelled.

The other preferable embodiment of the optical modulation system according to the fourth aspect of the present invention is as follows.

The phase modulator or the intensity modulator modulates outputs double side band signals. Then, the optical modulator modulates the double side band signals, and the other double side band signals are generated. The control part controls so that a frequency of either one of the double side band signals become equal to a frequency of an optical carrier signal or a high order optical signal of output light from the optical modulator, and the optical carrier signal or the high order optical signal is cancelled.

An optical modulation system of the present invention preferably further comprises: a circulator wherein the optical signal which have been combined at the combining part is inputted; and a fiber grating wherein output light from the circulator is inputted.

This embodiment of the optical modulation system is preferably an optical carrier suppressed double side band modulation system. This embodiment of the optical modulation system is preferable because a fiber grating and a circulator removes unnecessary components and the removed components are used as feedback signals.

The other aspect of the present invention is one of the above described optical modulation systems which further comprises: a control part which is connected to a detecting part of an output signal from the Mach-Zehnder waveguide (8), and outputs a control signal which controls voltage applied to each electrode to a signal source, wherein the control part (i) adjusts voltage applied to the first electrode (electrode A) (11), the second electrode (electrode B) (12), the $MZ_{CA}$ electrode, and the $MZ_{CB}$ electrode so as to increase output from the Mach-Zehnder waveguide (8), (ii) adjusts bias voltage applied to the $MZ_{CA}$ electrode and the $MZ_{CB}$ electrode so as to decrease output from the Mach-Zehnder waveguide (8), (iii) decreases bias voltage of either one of the sub Mach-Zehnder electrodes so as to decrease output from the Mach-Zehnder waveguide (8), and (iv) adjusts bias voltage applied to the $MZ_{CA}$ electrode and the $MZ_{CB}$ electrode so as to decrease output from the Mach-Zehnder waveguide (8).

The optical modulation system according to this aspect is preferably able to obtain a preferable bias voltage automatically by a bias adjusting method comprising the steps of:

(i) adjusting voltage applied to the first electrode (electrode A) (11), the second electrode (electrode B) (12), and the third electrode (electrode C) (13) so as to increase output from the Mach-Zehnder waveguide (8), (ii) adjusting bias voltage applied to the third electrode (electrode C) (13) so as to decrease output from the Mach-Zehnder waveguide (8), (iii) decreasing bias voltage of either one of the sub Mach-Zehnder electrodes so as to decrease output from the Mach-Zehnder waveguide (8), and (iv) adjusting bias voltage applied to the third electrode (electrode C) (13) so as to decrease output from the Mach-Zehnder waveguide (8).

By using the bias voltage adjusted in this way, in other words, by using a signal with relatively less carrier components or relatively less high order components, these components are suppressed by the method above explained. Therefore, the components to be suppressed can be suppressed more effectively.

The present invention provides an optical modulation system capable of controlling optical phases of output signals from the sub Mach-Zehnder waveguides respectively.

The present invention is able to control optical phases of output signals from the sub Mach-Zehnder waveguides. And the present invention is able to provide a DSB-SC modulation system which is able to suppress a carrier component ($f_0$) and a high order component (e.g. a second order component ($f_0 \pm 2f_m$)) by combining the phase modulated optical signals.

BRIEF DESCRIPTION OF THE DRAWINGS

FIG. 1A is a schematic block diagram showing optical modulation systems of the present invention. FIG. 1B is a schematic block diagram showing optical modulation systems of the present invention.

FIG. 2A is a conceptual diagram showing an example of a generation method of a carrier signal suppressed DSB modulation signals. FIG. 2B is a conceptual diagram showing an example of a generation method of a carrier signal suppressed SSB (single side band) modulation signal by using the optical modulation system of the present invention.

FIG. 4A to FIG. 4F is a conceptual diagram depicting intensity and phase of the optical signals of the DSB-SC modulation system according to the preferable aspect of the present invention. FIG. 4A is a conceptual diagram showing an optical signal spectrum on the first arm. FIG. 4B is a conceptual diagram showing an optical signal spectrum on the second arm. FIG. 4C is a conceptual diagram showing an optical signal spectrum on the first arm which is provided with a phase shift of +90 degrees. FIG. 4D is a conceptual diagram showing an optical signal spectrum on the second arm which is provided with a phase shift of −90 degrees. FIG. 4E is a conceptual diagram showing a spectrum of an output signal generated by interference of optical signals from the first arm and the second arm at the combining part. FIG. 4F is a conceptual diagram showing suppression of a third order signal component by applying a $3f_m$, signal.

FIG. 11A is a schematic diagram showing a basic arrangement of the optical modulation system according to the fifth aspect of the present invention. FIG. 11B is a schematic diagram showing a basic arrangement of the optical modulation system according to the fifth aspect of the present invention.

DESCRIPTION OF THE PREFERRED EMBODIMENTS

Figure 3:
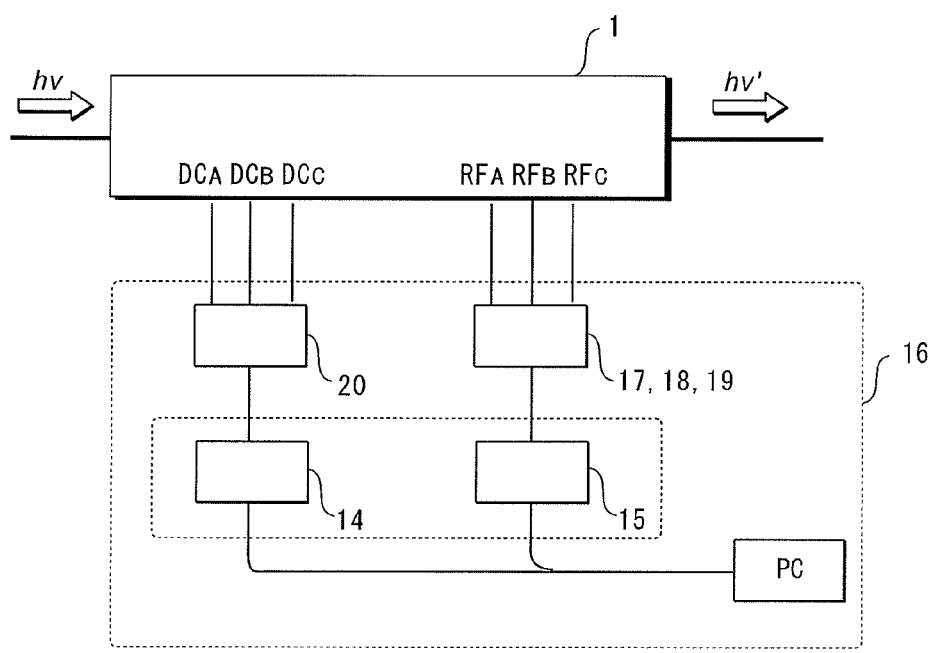
FIG. 3 is a diagram showing a signal source system according to a preferable aspect of the present invention.

Hereinafter, the present invention is explained referring to figures. FIG. 1A and FIG. 1B is a schematic block diagram showing an optical modulation system of the present invention. As shown in FIG. 1A the optical modulation system (1) of the present invention comprises: a Mach-Zehnder waveguide (8) including an input part (2) of an optical signal, a branching part (3) where the optical signal is branched, a first arm (4), which is configured to act as a waveguide, wherein one of the optical signal branched from the branching part (3) propagates though the first arm, a second arm (5), which is configured to act as a waveguide, wherein the remaining optical signal branched from the branching part (3) propagates though the second arm, a combining part (6) which combines the optical signals outputted from the first arm (4) and the second arm (5), and an output part (7) which outputs the optical signal which is combined at the combining part (6); a first intensity modulator (9) provided on the first arm (4) which controls amplitude of the optical signal propagating through the first arm (4); a second intensity modulator (10) provided on the second arm (5) which controls amplitude of the optical signal propagating through the second arm (5); a first electrode (electrode A) (11) of the first intensity modulator (9); a second electrode (electrode B) (12) of the second intensity modulator (10); a first main Mach-Zehnder electrode ($MZ_{CA}$ electrode) (13a) provided along at least a part of a waveguide portion between an output part of the first intensity modulator (9) and the combining part; and a second main Mach-Zehnder electrode ($MZ_{CB}$ electrode) (13b) provided along at least a part of a waveguide portion between an output part of the second intensity modulator (10) and the combining part.

It is to be noted that the preferable embodiment of the above system comprises, as shown in FIG. 1B, the first arm (4) and the second arm (5) which respectively composes the sub Mach-Zehnder waveguides.

The optical modulation system of the present invention comprises the first main Mach-Zehnder electrode ($MZ_{CA}$ electrode) and the second main Mach-Zehnder electrode ($MZ_{CB}$ electrode). Since these electrodes are able to adjust phases of output signals from the sub Mach-Zehnder waveguides and the like provided on both arms of the Mach-Zehlmder, optical phases of the output signals from the each sub Mach-Zehnder waveguides can be controlled. A carrier wave (a carrier signal) or a high order component (e.g. a second order component ($f_0 \pm 2f_m$)) of the optical signals to be combined is controlled so that the phases of the carrier wave or the high order component and the like are reversed, and then, the optical signals are combined, thereby suppressing these components. In order to suppress certain components this way, the following steps are preferably performed. A photodetector detects the output signal. A controlling part receives the optical signal measured by the photodetector, and the controlling part analyses intensity of a certain component to be suppressed which is contained in the optical signal to be detected, then the controlling part outputs an order to decrease intensity of the component to a signal source. Through these steps, voltage and the like which is able to suppress a certain signal component automatically can be obtained.

Each sub Mach-Zehnder waveguide, for example, is provided with a waveguide of nearly hexagonal shape (which composes two arms of the Mach-Zehnder), and is provided with two parallel-aligned phase modulators. The phase modulators are, for example, realized by electrodes laid along with the waveguides.

A Mach-Zehnder waveguide or an electrode is generally provided on a substrate. The material of the substrate and each waveguide is not specifically limited if light can propagate therethrough. For example, a lithium niobate waveguide with a Ti diffusion may be formed on an LN substrate, and a silicon dioxide ($SiO_2$) waveguide may be formed on a silicon (Si) substrate. Also, an optical semiconductor waveguide such as an InGaAsP waveguide (a GaAlAs waveguide) formed on an indium phosphide substrate (a GaAs substrate) may be used. The substrate is preferably formed of lithium niobate ($LiNbO_3$: LN) and cut out in a direction orthogonal to the X-axis (X-cut), and light is propagated in a Z-axis direction (Z-axis propagation). This is because a low-power-consumption drive and a superior response speed can be achieved due to dynamic electrooptic effect. An optical waveguide is formed in the surface portion of a substrate having an X-cut plane (YZ plane), and guided light propagates along the Z-axis (the optic axis). A lithium niobate substrate except the X-cut may be used. As a substrate, it is possible to use a material of a one-axis crystal having a crystal system such as a trigonal system and a hexagonal system and having electro optical effect or a material in which a point group of a crystal is $C_{3\nu}$, $C_3$, $D_3$, $C_{3h}$, and $D_{3h}$. These materials have a refractive index adjusting function in which a change in the refractive index due to the application of an electric field has a different sign depending on a mode of propagation light. As a specific example, lithium tantalite oxide ($LiTO_3$: LT), $\beta$-$BaB_7O_4$ (abbr. BBO), $LiIO_3$ and the like can be used other than lithium niobate.

The dimension of the substrate is not particularly limited if it is large enough to be able to form a predefined waveguide. The width, the length, and the depth of each waveguide is also not particularly limited if the module of the present invention is able to fulfill its function. The width of each waveguide can be, for example, around 1 μm to 20 μm, preferably about 5 μm to 10 μm. The depth (the thickness) of waveguide can be 10 nm to 1 μm, preferably 50 nm to 200 nm.

It is to be noted that a bias adjusting electrode is provided on the sub Mach-Zehnder waveguide. The first bias adjustment electrode (electrode A) is an electrode for controlling a phase of light propagating thorough the two arms of the $MZ_A$ by controlling bias voltage between two arms (path 1 and Path 3) composing the $MZ_A$. On the other hand, the second bias adjustment electrode (electrode B) is an electrode for controlling a phase of light propagating thorough the two arms of the $MZ_B$ by controlling bias voltage between two alms (path 2 and Path 4) composing the $MZ_B$. Direct current or low frequency signal is preferably applied to the electrode A and the electrode B in general. It is to be noted that "low frequency" of the low frequency electrode means frequency of, for example, 0 Hz to 500 MHz. A phase modulator for adjusting a phase of an electric signal is preferably provided at the output of the signal source of this low frequency signal in order to be able to control a phase of an output signal.

The first main Mach-Zehnder electrode ($MZ_{CA}$ electrode) (11) is laid along at least a part of the waveguide between an output part of the first sub Mach-Zehnder waveguide ($MZ_A$) and the combining part. And, "at least a part" is a length long enough to be able to adjust phase of an output signal.

The second main Mach-Zehnder electrode ($MZ_{CB}$ electrode) (12) is laid along at least a part of the waveguide between an output part of the second sub Mach-Zehnder waveguide ($MZ_B$) and the combining part, which is the same as the $MZ_{CA}$ electrode (11). It is to be noted that the first main Mach-Zehnder electrode ($MZ_{CA}$ electrode) and the second main Mach-Zehnder electrode ($MZ_{CB}$ electrode) may make the waveguide portions whereon each of the electrodes is provided act as an optical phase modulator.

The $MZ_{CA}$ electrode and the $MZ_{CB}$ electrode are preferably connected to a high frequency electric signal source. The high frequency electric signal source is a device for controlling signals propagating through waveguides adjacent to each other, and a publicly known high frequency electric signal source can be adopted. The range of frequency ($f_m$) inputted to the $MZ_{CA}$ electrode and the $MZ_{CB}$ electrode, for example, is from 1 GHz to 100 GHz. An output of the high frequency electric signal is, for example, a sinusoidal wave having a fixed frequency. It is to be noted that a phase modulator is preferably provided at an output of this high frequency signal source in order to be able to control phases of output signals.

The $MZ_{CA}$ electrode and the $MZ_{CB}$ electrode are composed of e.g. gold, platinum or the like. The width of the $MZ_{CA}$ electrode and the $MZ_{CB}$ electrode is, for example, 1 μm to 10 μm, and is specifically 5 μm. The length of the $MZ_{CA}$ electrode and the $MZ_{CB}$ electrode is, for example, 0.1 ties to 0.9 times the wavelength ($f_m$) of the modulation signal, including 0.18 to 0.22 times or 0.67 to 0.70 times. And more preferably, it is shorter than the resonant point of the modulation signal by 20 to 25%. This is because with such a length, the synthesized impedance with a stub electrode remains in an appropriate region. More specifically, the length of the $MZ_{CA}$ electrode and the $MZ_{CB}$ electrode is, for example, 3250 μm. Hereinafter, a resonant-type electrode and a traveling-wave-type electrode are described.

A resonant-type optical electrode (resonant-type optical modulator) is an electrode for performing a modulation by using resonance of a modulation signal. A known resonant-type electrode such as those described in the Japanese Patent Application Laid-Open 2002-268025, and [Tetsuya Kawanishi, Satoshi Oikawa, Masayuki Izutsu, "Planar Structure Resonant-type Optical Modulator", TECHNICAL REPORT OF IEICE, LQE2001-3 (2001-05)] can be adopted as a resonant-type electrode.

A traveling-wave-type electrode (traveling-wave-type optical modulator) is an electrode (modulator) for modulating light while guiding waves so that a lightwave and an electric signal are guided in the same direction (e.g. Hiroshi Nishihara, Masamitsu Haruna, Toshiaki Suhara, "Optical Integrated Circuit" (revised and updated edition), Olrsha, pp. 119-120). A publicly known traveling-wave-type electrode such as those described in Japan Patent Application Laid-Open Nos. 11-295674, 2002-169133, 2002-40381, 2000-267056, 2000-471159, and 10-133159, for example, can be adopted as a traveling-wave-type electrode.

As a preferable traveling-wave-type electrode, a so-called symmetrical-type earth electrode arrangement (one provided with at least a pair of earth electrodes on both sides of a traveling-wave-type signal electrode) is adopted. Thus, by symmetrically arranging the earth electrodes on both sides of the signal electrode, a high frequency wave outputted from the signal electrode is made easy to be applied to the earth electrodes arranged on the left and right side of the signal electrode, thereby suppressing an emission of a high frequency wave to the side of the substrate.

The $MZ_{CA}$ electrode and the $MZ_{CB}$ electrode may act as both of the electrodes for the RF signal and the DC signal. Namely, either one of or both of the $MZ_{CA}$ electrode and the $MZ_{CB}$ electrode are connected to a feeder circuit (bias circuit) for supplying the DC signal and the RF signal mixed.

The branching part (5) of the main MZ waveguide ($MZ_C$) is a part where optical signals branch into the first sub MZ waveguide ($MZ_A$) and the second sub MZ waveguide ($MZ_B$). The branching part (5) takes, for example, a Y-branching form. The combining part (6) is a part where optical signals outputted from the first sub MZ waveguide ($MZ_A$) and the second sub MZ waveguide ($MZ_B$) are combined. The combining part (6) takes, for example, a Y-branching form. The above Y-branching formed parts may be symmetry or asymmetry. As the branching part (5) or the combining part (6), a directional coupler may be used.

It is preferable for the optical modulator of the present invention to be provided with a control part electrically (or optically) connected to a signal source of each electrode so as to adequately control timing and phase of signals applied to each electrode. The control part acts as adjusting modulation time of a modulation signal applied to the first electrode (electrode A) and the second electrode (electrode B) and a modulation signal applied to the first main Mach-Zehnder electrode ($MZ_{CA}$ electrode) and the second main Mach-Zehnder electrode ($MZ_{CB}$ electrode). In other words, the control part adjusts considering propagation time of light so that modulation by each electrode is performed to a certain signal. This modulation time is adequately adjusted based on, for example, a distance between each electrode.

A control part, for example, adjusts voltage applied to the first main Mach-Zehnder electrode ($MZ_{CA}$ electrode) and the second main Mach-Zehnder electrode ($MZ_{CB}$ electrode) so that phase difference of optical carrier signals or certain high order optical signals contained in output signals from the first waveguide ($MZ_A$) and the second waveguide ($MZ_B$) becomes 180 degrees. This control part, for example, is a computer which is connected to signal sources of each electrode and stores a processing program. When the computer receives an input of control information from an input device such as a keyboard, a CPU reads out, for example, a processing program stored in a main program, and reads out necessary information from memories based on an order of the processing program, rewrites information stored in memories as needed, and outputs an order, which controls timing and phase difference of an optical signal outputted from a signal source, to signal source from an external output device. As the processing program, one that makes a computer have the following two means is adopted. One is a means for grasping phase of a certain component on each sub Mach-Zehnder, and the other is a means for generating an order to adjust a modulation signal applied to the first main Mach-Zehnder electrode ($MZ_{CA}$ electrode) and the second main Mach-Zehnder electrode ($MZ_{CB}$ electrode), so that the phase of a certain component is reversed, by using phase information of a certain information grasped by the means for grasping.

2. Operation Example of Optical Modulation System

Hereinafter, an operation example of the optical modulation system is described. With respect to light, bias voltages are applied to the electrode A and the electrode B so that phase difference of the optical signals becomes respectively 90 degrees. These phase difference of the optical signals is adjusted as needed, but is basically adjusted to be an integral multiple of 90 degrees.

Ideally, an optical signal whose frequency is shifted by the frequency of the each RF signal is outputted from the sub mach-Zehnder. In reality, a carrier wave (carrier signal) or a high order component (e.g. a second order component ($f_0 \pm 2f_m$)) is contained in the optical signal. The optical modulation system of the present invention operates to suppress at least one of them.

In other words, the phase of a carrier wave (carrier signal) or a high order components (e.g. a second order component ($f_0 \pm 2f_m$)) of optical signals outputted from each sub Mach-Zehnder waveguide are decided by phase or bias voltage of signals applied to each sub Mach-Zehnder waveguide. Therefore, components to be suppressed are effectively suppressed by adjusting phases of output signals from each sub Mach-Zehnder waveguide so that the phases of components to be suppressed (carrier waves (carrier signals) of an optical signal or a high order component (e.g. a second order component ($f_0 + 2f_m$)) are reversed, before combined at the combining part. By this control, components to be suppressed are effectively suppressed.

It is to be noted that the optical modulation system of the present invention can be used as a DSB-SC modulator, an FSK modulator, an SSB modulator and the like, but preferably used as a DSB-SC modulator.

FIG. 2A is a conceptual diagram showing an example of a generation method of a carrier signal suppressed DSB modulation signal using the optical modulation system of the present invention. As shown in FIG. 2A, carrier signals having the same phase, for example, remain in the optical signals obtained in each sub Mach-Zehnder waveguide. By adjusting a phase difference of each optical signal to become 180 degrees, the phase difference of carrier components at point P and point Q of FIG. 1 assumes 180 degrees. When the above adjusted optical signals are combined at the combining part (6), carrier components are suppressed by canceling each other. On the other hand, the upper side band components (USB): +1 and the lower side band components (LSB): −1 are not suppressed but remain, because the phases are not reversed. Thus the DSB-SC modulation is realized.

FIG. 2B is a conceptual diagram showing an example of a generation method of a carrier signal suppressed SSB (single side band) modulation signal using the optical modulation system of the present invention. As shown in FIG. 2B, carrier signals having the same phase, for example, remain in the optical signals obtained in each sub Mach-Zehnder waveguide. By adjusting a phase difference of each optical signal to become 180 degrees, the phase difference of carrier components at point P and point Q of FIG. 1 assumes 180 degrees. When the above adjusted optical signals are combined at the combining part (6), carrier components are suppressed by canceling each other. On the other hand, the upper side band component (USB): +1 is not suppressed and remain, because the phase is not reversed. But the lower side band component (LSB); −1 is suppressed and canceled, because the phase is reversed. Thus the SSB-SC modulation is realized.

3. Manufacturing Method of Optical Modulation System

The optical modulation system of the present invention comprises a substrate, waveguides formed on the substrate, electrodes, a signal source, a measuring part, a control part and the like. As a forming method of an optical waveguide, a publicly know forming method of the internal diffusion method such as the titanium diffusion method or a proton exchange method and the like can be used. In other words, the optical FSK modulator of the present invention, for example, can be manufactured by the following method. Firstly, an optical waveguide is formed by patterning titanium on the surface of a wafer of lithium niobate by photolithography method, and spreading titanium by thermal diffusion method. This is subject to the following conditions. The thickness of titanium is 100 to 2000 angstrom, diffusion temperature is 500 to 2000° C., and diffusion time is 10 to 40 hours. An insulating buffer layer of silicon dioxide (thickness of 0.5 to 2 μm) is formed on a principle surface of the substrate. Secondly, an electrode with metal plating with thickness of 15 to 30 μm is formed on the buffer layer. And lastly, the wafer is cut off. By these processes, an optical modulator formed with titanium-diffused waveguide is manufactured.

The optical modulation system, for example, can be manufactured by the following process. A waveguide can be provided on the substrate surface of lithium niobate by proton exchange method or titanium thermal diffusion method. For example, Ti metal stripe (length of few μm) is formed in a row on an LN substrate by photolithographic technique. Subsequently, Ti metal is diffused into the substrate by exposing the LN substrate to heat (about 1000° C.). Through this process, a waveguide can be formed on an LN substrate.

Also, an electrode is manufactured in the same way as the above process. For example, in the same way as a formation of an optical waveguide, by using photolithography technique, an electrode can be formed on both sides of a plurality of waveguides which are formed in the same breadth, the electrode being formed so that the interelectrode gap is about 1 μm to 50 μm.

In case of manufacturing an electrode using silicon substrate, the manufacturing process, for example, is as follows. A lower cladding layer is disposed on a silicon (Si) substrate by the flame hydrolysis deposition method, the lower cladding layer being composed mostly of silicon dioxide ($SiO_2$). And then a core layer is deposed, the core layer being composed mostly of silicon dioxide ($SiO_2$) to which germanium dioxide ($GeO_2$) is added as a dopant. Subsequently, vitrification is performed in an electric furnace. And then, an optical waveguide is formed by etching and an upper cladding layer is disposed, the upper cladding layer being composed mostly of silicon dioxide ($SiO_2$). And then, a thin-film heater thermooptic intensity modulator and a thin-film heater thermooptic phase modulator are formed on the upper cladding layer.

FIG. 3 is a block diagram showing a signal source part of the optical modulation system according to a preferable aspect of the present invention. As shown in FIG. 3, the signal source part according to this aspect comprises: the first electrode (electrode A) (11); the second electrode (electrode B) (12); a first signal source (14) for supplying bias voltage applied to the third electrode (electrode C: $MZ_{CA}$ and $MZ_{CB}$); and a second signal source (high frequency signal source) (15) for supplying a radio frequency signal to the third electrode (electrode C) (13), wherein the second signal source (high frequency signal source) (15) includes: a third harmonic signal generator (17) for generating an electric signal ($3f_m$) whose frequency is three times the frequency of a basic signal ($f_m$); a phase adjusting part (18) for adjusting a phase difference between a phase of the basic signal ($f_m$) and a phase of the electric signal ($3f_m$) wherein the basic signal ($f_m$) is outputted from the second signal source (high frequency signal source) (15), the electric signal ($3f_m$) is outputted from the third harmonic signal generator (17), and the electric signal ($3f_m$) has frequency three times the frequency of the basic signal ($f_m$); and a signal intensity adjusting part (19) for adjusting intensity of the basic signal ($f_m$) or the electric signal ($3f_m$) wherein the basic signal ($f_m$) is outputted from the second signal source (high frequency signal source) (15), the electric signal ($3f_m$) is generated from the third harmonic signal generator (17), and the electric signal ($3(f_m)$) has a frequency three times the frequency of the basic signal ($f_m$).

The third harmonic signal generator (17) generates a third harmonic signal ($3f_m$) which has a frequency three times of the frequency of the basic signal ($f_m$). The second signal source (high frequency signal source) (15) generates the basic signal ($f_m$). Then the phase adjusting part (18) adjusts phase difference between the phase of the basic signal ($f_m$) and the phase of the third harmonic signal ($3f_m$). And the signal intensity adjusting part (19) adjusts intensity of the third harmonic signal ($3f_m$). And the third harmonic signal is applied to the electrode after having been adjusted so that the first order component ($f_0 \pm 3f_m$), which is generated by applying the third harmonic signal ($3f_m$), and the third order component, which is generated by applying the basic signal ($f_m$), have reversed phase and the same intensity level. Thus, the first order component and the third order component cancel each other, and an optical modulation with a high extinction ratio can be realized.

The third harmonic signal generator (17) generates a third harmonic signal ($3f_m$) which has a frequency three times of the frequency of the basic signal ($f_m$). The second signal source (high frequency signal source) (15) generates the basic signal ($f_m$). Then the phase adjusting part (18) adjusts phase difference between the phase of the basic signal ($f_m$) and the phase of the third harmonic signal ($3f_m$). And the signal intensity adjusting part (19) adjusts intensity of the third harmonic signal ($3f_m$). And the third harmonic signal is applied to the electrode after having been adjusted so that the first order component ($f_0 \pm 3f_m$), which is generated by applying the third harmonic signal ($3f_m$), and the third order component, which is generated by applying the basic signal ($f_m$), have reversed phase and the same intensity level. Thus, the first order component and the third order component cancel each other, and an optical modulation with a high extinction ratio can be realized.

It is to be noted that, in the optical modulation system of the present invention, the basic signal of frequency ($f_m$) and the third harmonic signal of frequency ($3f_m$) are preferably applied to the electrode C ($MZ_{CA}$ and $MZ_{CB}$).

It is preferable for the optical modulation system of the present invention to be provided with a control part electrically (or optically) connected to a signal source of each electrode so as to adequately control timing and phase of signals applied to each electrode. The control part acts as adjusting modulation time of a signal applied to the $RF_A$ electrode, the $RF_B$ electrode and the $RF_C$ electrode (i.e. the $RF_A$ signal, the $RF_B$ signal and the $RF_C$ signal). In other words, the control part adjusts considering propagation time of light so that each electrode modulates a certain signal. This modulation time is adequately adjusted based on, for example, a distance between each electrode.

The signal source part (16), for example, includes a first signal source (14) and a second signal source (high frequency signal source) (15). The first signal source supplies bias voltage to the first electrode (electrode A) (11), the second electrode (electrode B) (12), and the third electrode (electrode C) (13). The second signal source supplies radio frequency signal to the third electrode (electrode C) (13). Intensity, delay (phase), apply timing of bias voltage may be adjusted by the adjusting pail (20) as needed. It is to be noted that, the optical signal outputted from the high frequency signal source is, for example, branched in two routes by conductive wire and the like, and amplitude or phase of the each signal is adjusted as needed, then the modulation signals are applied to the $MZ_{CA}$ electrode and the $MZ_{CA}$ electrode.

The second signal source (high frequency signal source) (15) comprises, for example, the third harmonic signal generator (17), the phase adjusting part (18), and the signal intensity adjusting part (19). The third harmonic signal generator (17) generates the electric signal ($3f_m$) having frequency three times the frequency of the basic signal ($f_m$). The phase adjusting part (18) adjusts the phase difference between the phase of the basic signal ($f_m$) which is outputted from the second signal source (high frequency signal source) (15) and the phase of the electric signal ($3f_m$) which is outputted from the third harmonic signal generator (17) and has frequency three times the frequency of the basic signal ($f_m$). The signal intensity adjusting part (19) adjusts the intensity of the basic signal ($f_m$) which is outputted from the second signal generator (high frequency signal source) (15) and the electric signal ($3f_m$) which is outputted from the third harmonic signal generator (17) and has frequency three times the frequency of the basic signal ($f_m$). The electric signal ($f_m$) such as a sinusoidal wave signal outputted from the high frequency signal source (15) is branched in two routes by conductive wire and the like. The electric signal is inputted in the third harmonic signal generator (19) through one of the two routes. The electric signal is then turned into an electric signal with frequency $3f_m$, and its amplitude and phase are adjusted. And then the signal is combined with the electric signal fan above, and inputted to the optical modulator.

A control part (PC), for example, adjusts voltage applied to the electrode C so that phase difference of optical carrier signals or certain high order optical signals contained in output signals from the first sub Mach-Zehnder waveguide ($MZ_A$) and the second sub Mach-Zehnder waveguide ($MZ_B$) become 180 degrees. This control part, for example, is a computer which is connected to signal sources of each electrode and stores a processing program. When the computer receives an input of control information from an input device such as a keyboard, a CPU reads out, for example, a processing program stored in a main program, and reads out necessary information from memories based on an order of the processing program, rewrites information stored in memories as needed, and outputs an order, which controls timing and phase difference of an optical signal outputted from a signal source, to signal source from an external output device. As the processing program, one that makes a computer have the following two means is adopted. One is a means for grasping phase of a certain component on each sub Mach-Zehnder waveguide, and the other is a means for generating an order to adjust a modulation signal applied to the electrode C so that the phase of a certain component is reversed by using phase information of a certain component grasped by the means for grasping.

It is to be noted that in case the optical modulator of the present invention acts as the DSB-SC modulator, the non-desired component cannot always be effectively suppressed by adjusting the electric signal so that the third order component is cancelled. Therefore, it is preferable to adjust the electric signal so that the third order component is cancelled by using the above control part.

Hereinafter, the operation of the optical modulation system is described. The $MZ_C$ electrode controls the phase difference of the optical signal propagating through the first arm (4) and the second arm (5) of the Mach-Zehnder waveguide. When the phase difference of the optical signal propagating through the both alms is supposed to be g(t), and integer is represented by n, and if g(t) is equal to $2n\pi$, then the optical modulation system is ON state. On the other hand, if g(t) is equal to $(2n+1)\pi$, the optical modulation system is OFF state. In other words, in this OFF state case, the optical signal is converted to the high order radiation mode light, and emitted without being propagated to the output part. As this way, by adjusting voltage applied to electrodes of the modulation system, ON state and OFF state is switched over to output a signal.

In other words, the intensity of the output signal is proportional to | cos (g(t))/2|. This is the reason why the Mach-Zehnder is mentioned as intensity modulator. It is to be noted that the intensity in the OFF state is ideally zero. Therefore, the intensity ratio between On state and OFF state is ideally infinite. But, in reality, carrier components and high order components remain in the output signal. Therefore, the intensity cannot be zero in the OFF state. The extinction ratio, which is an intensity ratio between the ON state and the OFF state, is an important index to evaluate a characteristic of the Mach-Zehnder waveguide.

When a phase difference of optical signals of the both aims caused by bias voltage applied to the electrode C is supposed to be $\phi_B$, the frequency of the modulation signal applied to the electrode C is supposed to be ($f_m$), and g(t) is supposed to be sin $2A^{RF}$ sin $2\pi f_m t + \phi_B$, optical intensity ($D_1$) of the first order component (USB or LSB) and optical intensity ($D_2$) of the second order component are represented by the following formulas.

$$D_1 = \left| \frac{2A^{RF} \sin\phi_B}{1 + (1 - |A^{RF}|^2)\cos\phi_B} \right| \quad \text{Formula 1}$$

$$D_2 = \left| \frac{|A^{RF}|^2 \cos\phi_B}{1 + (1 - |A^{RF}|^2)\cos\phi_B} \right|$$

It is understood from the above formulas that if the bias voltage is adjusted so that $\phi_B$ becomes $\pi$, an even order component, such as a second order component which has carrier component, will be 0, and an average intensity will be around $2|A^{RF}|$. The intensity of a third order component does not remain substantially, and the intensity of a first order component (USB and LSB) remains, thereby realizing the DSB-SC modulation.

However, in the real optical modulation system such as DSB-SC modulation system, unsuppressed carrier component and unsuppressed high order component (especially, third order component) remain, whereby the extinction ratio cannot be infinite. In order to solve this problem, the optical modulator (1) according to a preferable aspect of the present invention operates as follows. The third harmonic signal generator generates an electric signal ($3f_m$) which has a frequency three times of the frequency of the basic signal ($f_m$). And the phase adjusting part (18) adjusts phase difference between a phase of the basic signal ($f_m$) and that of the electric signal ($3f_m$), wherein the basic signal ($f_m$) is outputted from the second signal source (high frequency signal source) (15) and the electric signal ($3f_m$), which has a frequency three times of the frequency of the basic signal ($f_m$), is outputted from the third harmonic signal source (17). The signal intensity adjusting pail (19) adjusts the electric signal ($3f_m$). And the signal ($3f_m$) as a modulation signal is adjusted so that the first order component, which is generated by applying a signal ($3f_m$), and the third order component, which is generated by applying the basic signal ($f_m$), have reversed phase and the same intensity level. This adjustment may be performed by manual operation while monitoring output from the Mach-Zehnder waveguide. It may also be performed by the control part which adjusts phase and timing of the output signal outputted from the signal source part as needed, and applies a preferable signal to an electrode (especially, electrode C) while monitoring the output from the Mach-Zehnder waveguide. In this optical modulation system, a modulation signal with frequency ($f_m$) and a modulation signal with frequency ($3f_m$) are both applied to the electrode C.

FIG. 4A to FIG. 4F is a conceptual diagram depicting intensity and phase of the optical signals of the DSB-SC modulation system according to the preferable aspect of the present invention. FIG. 4A is a conceptual diagram showing an optical spectrum on the first arm. FIG. 4B is a conceptual diagram showing an optical spectrum on the second arm. FIG. 4C is a conceptual diagram showing an optical signal spectrum on the first arm which is provided with a phase shift of +90 degrees. FIG. 4D is a conceptual diagram showing an optical signal spectrum on the second arm which is provided with a phase shift of −90 degrees. FIG. 4E is a conceptual diagram showing a spectrum of an output signal generated by interference of optical signals from the first arm and the second arm at the combining part. FIG. 4F is a conceptual diagram showing suppression of a third order signal component by applying a $3f_m$ signal.

These optical signals outputted from the first arm and the second arm interferes with each other at the combining part. As a result, as shown in FIG. 4E, a carrier component ($f_0$) and a second order component ($f_0\pm2f_m$) are suppressed ideally, and USB component ($f_0+f_m$) and LSB ($f_0-f_m$) component remain. It is to be noted that the odd order component such as a third order component remains but the intensity is not as large as that of a first order component.

However, if a third order component remains, the extinction ratio cannot be improved. Therefore, in the present invention, as shown in FIG. 4(f), a third harmonic signal which has frequency ($3f_m$) is also applied to the electrode C so that the third order component, generated from frequency ($f_m$), and the first order component, generated from frequency ($3f_m$), suppresses each other. This is realized by, as shown in FIG. 4(f), adjusting output of the signal source so that the first order component, generated from frequency ($3f_m$), and the third order component, generated from frequency ($f_m$), have reversed phase and about the same level of intensity. As shown in FIG. 4(f), since the first order component, generated from frequency ($3f_m$), and the third order component, generated from frequency ($f_m$), have reversed phase and about the same level of intensity, the third order component ($f_0+3f_m$) is effectively suppressed. Although the high order components such as a fifth order component, a seventh order component, and the like remain, intensities of these components are relatively minute and are not a substantial problem. But if the system of the present invention is applied to the high order components, for example, by applying high frequency signals such as a modulation signal $5f_m$ and a modulation signal $7f_m$ whose phase, intensity (amplitude) and the like are adjusted, to the electrode C, these components can be effectively suppressed.

In reality, not only an odd order component but a carrier wave (a carrier signal) or a high order component (e.g. a second order component ($f_0+2f_m$)) of an optical signal are contained in signals. The optical modulation system of the present invention operates to suppress at least one of these components.

The phases of carrier waves (carrier signals) and a high order component (e.g. a second order component ($f_0\pm2f_m$)) of optical signals outputted from each sub Mach-Zehnder waveguide are decided by phase or bias voltage of a signal applied to each sub Mach-Zehnder waveguide. Therefore, components to be suppressed are effectively suppressed by adjusting phases of output signals from each sub Mach-Zehnder waveguide, so that the phases of components to be suppressed (carrier waves (carrier signals) of optical signals or a high order component (e.g. a second order component ($f_0\pm2f_m$)) are reversed, before combined at the combining part.

Figure 5:
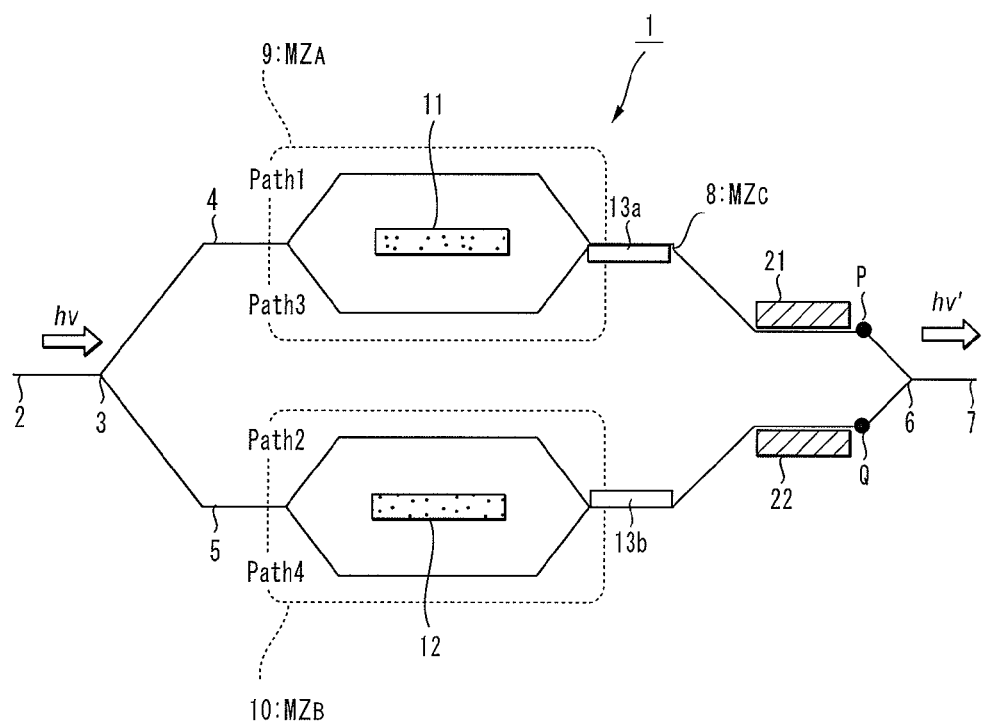
FIG. 5 is a schematic block diagram showing an optical modulation system according to the second aspect of the present invention.

FIG. 5 is a schematic block diagram showing an optical modulation system according to the second aspect of the present invention. Since the optical modulation system comprises $MZ_{CA}$ electrode and the $MZ_{CB}$ electrode (in other words, comprises two main Mach-Zehnder electrodes (electrode C)), the optical modulation system can effectively suppress components to be suppressed by adjusting non-desired components (a carrier, a second order component, a third order component) to have reversed phase, whereby the non-desired components are effectively suppressed.

Hereinafter, the optical modulation system of the present invention according to the second aspect of the present invention is described. Bias voltages are applied to the $DC_A$ electrode and the $DC_B$ electrode of the parallel aligned four optical modulators of the sub MZ waveguides so that the phase difference of the optical signals become 90 degrees respectively. These phase differences of the electric signals and the optical signals are adjusted as needed, but are basically adjusted to be an integral multiple of 90 degrees.

Ideally, an optical signal whose frequency is shifted by the frequency of the each RF signal is outputted from the sub mach-Zehnder. In reality, a carrier wave (carrier signal) or a high order component (e.g. a second order component ($f_0\pm2f_m$)) is contained in the optical signal. The optical modulation system of the present invention operates to suppress at least one of them.

In other words, the phases of carrier waves (carrier signals) and a high order component (e.g. a second order component ($f_0 \pm f_m$)) of optical signals outputted from each sub Mach-Zehnder waveguide are decided by phase or bias voltage of signals applied to each sub Mach-Zehnder waveguide. Therefore, components to be suppressed are effectively suppressed by adjusting phases of output signals from each sub Mach-Zehnder waveguide so that the phases of components to be suppressed (carrier waves (carrier signals) of an optical signal or a high order component (e.g. a second order component ($f_0 \pm 2f_m$)) are reversed before combined at the combining part.

Figure 6:
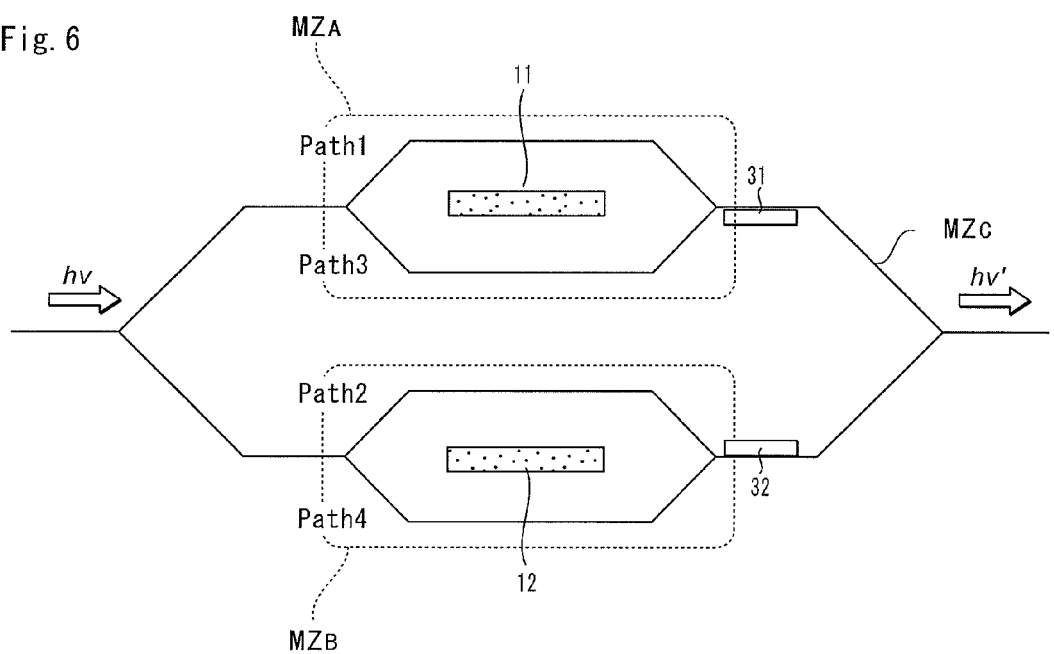
FIG. 6 is a schematic diagram showing a basic arrangement of an optical modulation system according to the third aspect of the present invention.

FIG. 6 is a schematic diagram showing a basic arrangement of an optical modulation system according to the third aspect of the present invention. As shown in FIG. 6, the optical modulation system according to the third aspect of the present invention relates to the above described optical modulation system which further comprises either one or both of an optical intensity compensation mechanism (31) and an optical intensity compensation mechanism (32) wherein the optical intensity compensation mechanism (31) is provided along the first arm (4) between the first intensity modulator (9) and the combining part (6), and the optical intensity compensation mechanism (32) is provided along the second arm (5) between the second intensity modulator (10) and the combing part (6).

Since the optical modulation system comprises the optical intensity compensation mechanism (e.g. an intensity modulator), the optical modulation system is able to adjust the intensities of components to be suppressed to the same level effectively. Therefore, by adjusting these components to have reversed phases, these components can be effectively suppressed. And, as far as the phase control is concerned, the optical modulation system according to the second aspect above explained may be adopted.

Figure 7:
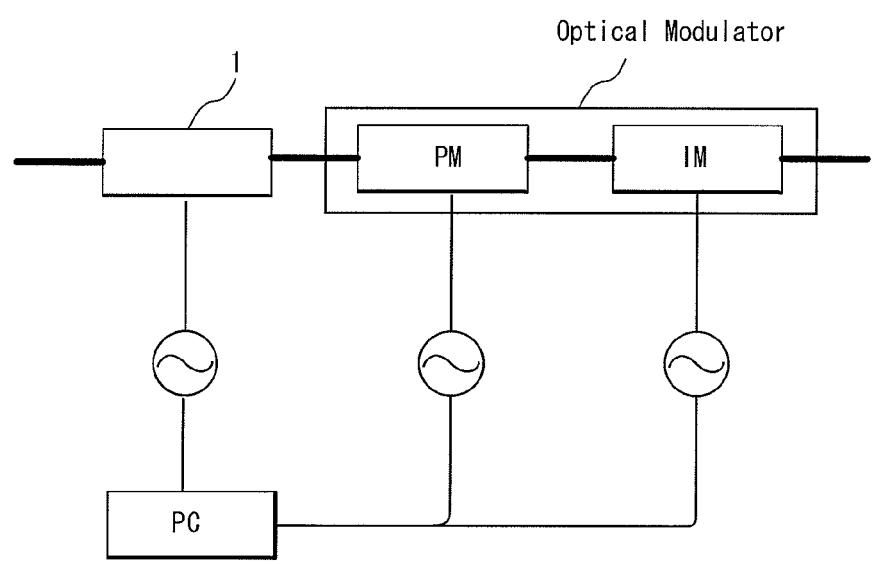
FIG. 7 is a schematic diagram showing a basic arrangement of an optical modulation system according to the fourth aspect of the present invention.

FIG. 7 is a schematic diagram showing a basic arrangement of an optical modulation system according to the fourth aspect of the present invention. As shown in FIG. 7, the optical modulation system according to the forth aspect of the present invention comprises: an optical modulation system as an optical modulator above described; either one or both of a phase modulator and an intensity modulator for modulating output light from the optical modulator or input light to the optical modulator; and a control part for controlling modulation time of a modulation signal of the optical modulator and a modulation signal of the phase modulator or the intensity modulator.

FIG. 7 shows an optical modulation system in which light is modulated first by the optical modulator and then by the phase modulator or the intensity modulator. But an optical modulation system in which light is modulated first by the phase modulator or the intensity modulator and then by the optical modulator acts as well. It is to be noted that, in FIG. 7, PM represents a phase modulator, and IM represents an intensity modulator. The phase modulator, for example, controls phase modulation amount of an optical signal which is modulated by applying an electric field to a waveguide. In specific, a waveguide and an electrode which is configured to apply an electric field to the waveguide is used.

The optical modulation system according to the fourth aspect of the present invention relates to an optical modulator, an optical modulation system including an phase and intensity modulator (specifically, two-electrode MZ-type modulator) which modulates output light and input light of the optical modulator, and the like.

There remain unsuppressed carrier components in the output of the optical modulator such as an optical DSB-SC modulator. These unsuppressed carrier components prevent extinction ratio from improving. However, a high extinction ratio modulation can be realized by the following process.

A phase modulation and/or an intensity modulation are performed to the output light from the optical amplitude modulator, or a modulation is performed to an input light so that the unsuppressed components are suppressed. In this process, phase and timing of sidebands offset form the first sidebands (whose frequency is equal to that of a carrier or a high order component) are adjusted so that carrier components (or high order components) are suppressed. Thus, carrier components (or high order components) can be suppressed, thereby realizing an optical modulation system which can perform high extinction ratio modulation.

A preferable embodiment of the optical modulation system according to the fourth aspect of the present invention is the above described optical modulation system, wherein the control part controls that the phase modulator or the intensity modulator modulates either one or both of double side band signals of an output signal from the optical modulator or input light to the optical modulator so that a frequency of either one of the double side band signals outputted from the optical modulator becomes equal to a frequency of an optical carrier signal or a high order optical signal of output light from the optical modulator, thereby the optical carrier signal or the high order optical signal being cancelled.

Or the above mentioned control part controls so that either one of double side band signals (USB signal or LSB signal) and the optical carrier wave signal or a high order signal have the same level of frequency, and the optical carrier signal or a high order signal is cancelled. The double side band signals above mentioned is generated by the following process. The phase modulator or the intensity modulator, by modulating the input light to the optical modulator, generates the double side band signals. The double side band signals are then inputted to the optical amplitude modulator and the other double side band signals are offset from the respective USB signals and LSB signals.

Hereinafter, spectrum of the optical signal of the optical modulation system according to the fourth aspect of the present invention is described. It is to be noted that the phase modulator (PM) and the intensity modulator (IM), as optical modulators, are connected to the optical modulation system in this order.

Figure 8:
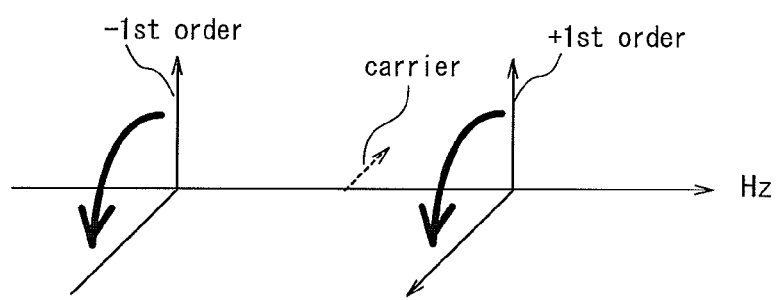
FIG. 8 is a schematic diagram showing an example of a modulation signal outputted from the phase modulator of the optical modulation system according to the fourth aspect of the present invention.

FIG. 8 is a schematic diagram showing an example of a modulation signal outputted from the phase modulator of the optical modulation system according to the fourth aspect of the present invention. This example shows suppression of the carrier signal components by using side band signals offset from the side band signals of the first order component. As shown in FIG. 8, optical phases of one or more than two of side band signals (+first order, −first order), a carrier signal, or a high order component signal not shown in figures of the modulation signal outputted from the phase modulator are modulated. In FIG. 8, the phase of the first order component is modulated.

In particular, the phase modulator grasps an optical signal to be suppressed (a carrier signal or a high order component signal). The phase modulator also grasps phase of a side band signal which have been modulated by the intensity modulator, and is used to suppress the optical signal to be suppressed. The phase modulator controls these signals so that the phases of these signals, having been modulated by the optical modulator, are reversed. In the example of the FIG. 8, a phase of the unsuppressed carrier signal component and a phase of the side band signal are originally shifted by $\pi/2$. Therefore, the phase modulator, having received an order from the control part, controls voltage applied to an electrode so that the phases of the side band signals are shifted further by $\pi/2$.

Thus, the phase of the carrier signal component and the phase of the side band signal are shifted by π (in other words, the phases are reversed).

Figure 9:
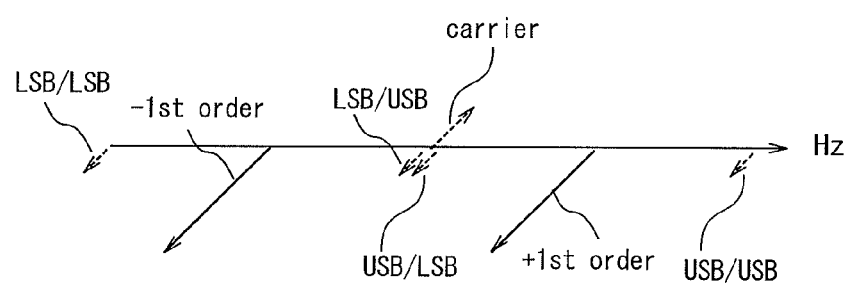
FIG. 9 is a schematic diagram explaining a modulation signal outputted from an intensity modulator.
Figure 10:
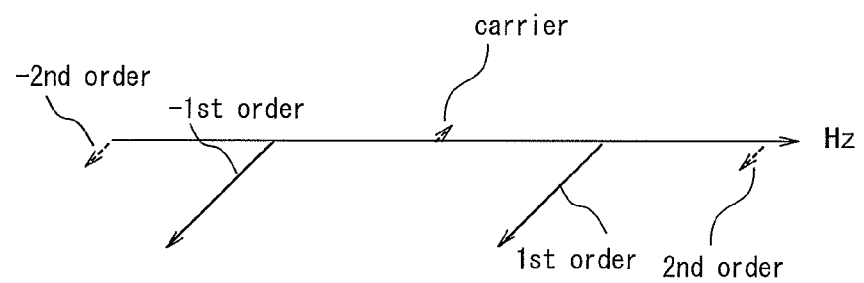
FIG. 10 is a schematic diagram showing a modulation signal outputted from an intensity modulator.
Figure 12:
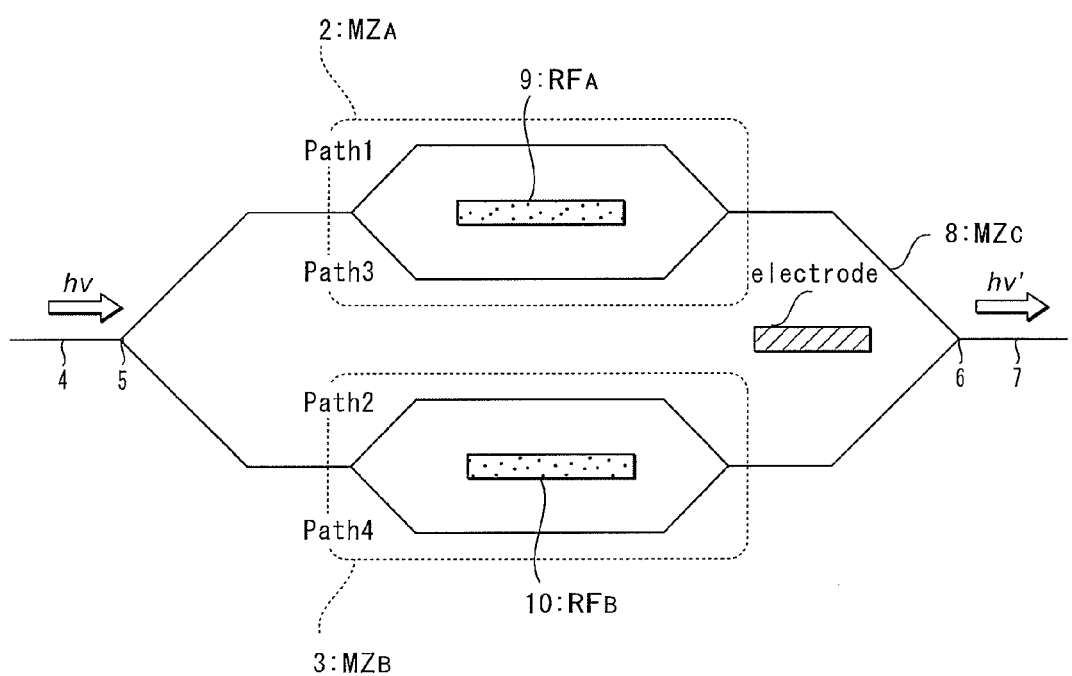
FIG. 12 is a schematic diagram showing a basic arrangement of a conventional optical modulation system acting as an optical SSB modulator or an optical FSK modulator.

FIG. 9 is a schematic diagram explaining a modulation signal outputted from the intensity modulator FIG. 10 is a schematic diagram showing a modulation signal outputted from the intensity modulator. As shown in FIG. 9, on the modulation signal outputted from the intensity modulator, the optical signal to be suppressed (a carrier signal or a high order component signal) and the side band signals which suppress the optical signal have the same frequency level and mutually reversed phases. In FIG. 9, a carrier signal and an USB signal of an LSB signal or an LSB signal of an USB signal have reversed phases. Therefore, as shown in FIG. 10, in the modulation signal outputted from the intensity modulator, the intensity of a signal to be suppressed is lowered (ideally suppressed).

FIG. 11 is a diagram explaining the optical modulation system according to the fifth aspect of the present invention. FIG. 11A shows a preferable embodiment of the optical modulation system according to the fifth aspect of the present invention. FIG. 11B shows the other embodiment of the optical modulation system according to the fifth aspect of the present invention. As shown in FIG. 11, the optical modulation system according to the fifth aspect of the present invention is the above described optical modulation system comprising: a circulator (42) wherein the optical signal which have been combined at the combining part is inputted; and a fiber grating wherein an output light from the circulator is inputted.

In particular, it is the optical modulation system comprising the above described optical modulation system which acts as an optical modulator, a circulator, a fiber grating, a photodetector, and a control part. An output signal from the optical modulator is inputted to the circulator. An output light from the circulator is inputted to the fiber grating which reflects predetermined optical signal components outputted from the optical modulator and transmits the other optical signal components. The photodetector detects the optical signal which has transmitted through the fiber grating. The control part controls a signal based on the optical signal detected by the photodetector. The signal is outputted from the signal source which applies a signal to the optical modulator.

The optical modulation system of this embodiment is preferable because unnecessary components are removed by the fiber grating and the circulator, and the removed components can be used as feed back signals.

In particular, the fiber grating (43), for example, is configured to reflect only components which are wanted as output components. A necessary component (e.g. a $(f_0 \pm f_m)$ component) of the optical signal, which is inputted to the fiber grating (43) from the circulator (42), is reflected by the fiber grating and inputted to the circulator (42). And the optical signal, which is inputted to the circulator via the fiber grating, is transmitted to the output part, not the combining part. On the other hand, optical signals transmitted trough the fiber grating are unnecessary components. Therefore, unnecessary components are removed by the fiber grating, thereby generating optical signals with ideal spectra.

On the other hand, a preferable embodiment of the present invention is an optical modulation system, wherein the photodetector (44) detects the optical signal which is removed by the fiber grating, the detected signal is transmitted to the control part (23), and a signal of the signal source system (16) is controlled so that the components other than necessary components (e.g. a $(f_0 \pm f_m)$ component) are decreased.

Specifically, the optical modulation system of this embodiment, used with the optical modulation system according to the sixth aspect of the present invention, is able to decrease the components other than necessary components by adjusting voltage level applied to various signal sources.

The optical modulation system according to the fifth aspect of the present invention is preferably a DSB-SC modulation system. In the optical modulation system of this embodiment, for example, the optical frequency which is reflected by the fiber grating is set to be $(f_0 \pm f_m)$. It is also set so that $(f_0 + f_m)$ or $(f_0 - f_m)$ is reflected. In this case, the optical modulation system can be used as an SSB modulation system.

As shown in FIG. 11B, the optical modulation system according to the fifth aspect of the present invention may be configured so that necessary components transmit the fiber grating. In this case, unnecessary components are reflected by the fiber grating and decreased. It is also possible for the control part to control the signal source so that unnecessary components are decreased in the same way as the above explanation by detecting the unnecessary components by the circulator.

A uniform fiber grating, a chirp grating, or a multisection grating are, for example, used as the fiber grating (FBG). Also, the fiber grating may be capable of providing modulation. Hereinafter, the FBG is explained. The FBG can be obtained, for example, by radiating ultraviolet rays through a phase mask to change the core refractive index by a predetermined pitch.

A uniform FBG is an FBG whose grating has a cycle, refractive index and the like that are uniform. It is to be noted that for a pitch of a grating, an appropriate interval corresponding to a wavelength of a subject light can be used. For example, 100 nm to 1000 nm can be used, while 300 nm to 800 nm is acceptable. Also, as a refractive index difference, $1 \times 10^{-6}$ to $1 \times 10^{-2}$ can be used, while $1 \times 10^{-5}$ to $5 \times 10^{-3}$ and $1 \times 10^{-4}$ to $1 \times 10^{-3}$ are acceptable.

A chirp grating has a refractive index cycle and grating cycle changed in a longitudinal direction of the FBG. It is to be noted that while usually the pitches of the grating of the chirped FBG are gradually changed, one with appropriate intervals may be used according to the wavelength of the subject light. For example, 100 nm to 1000 nm can be used, while 300 nm to 800 nm is acceptable. Also, as the difference of refractive index of the grating against the core, $1 \times 10^{-6}$ to $1 \times 10^{-2}$ can be mentioned, while $1 \times 10^{-5}$ to $5 \times 10^{-3}$ and $1 \times 10^{-4}$ to $1 \times 10^{-3}$ are acceptable.

A multi-section FBG is an FBG in which changes in wavelengths and changes in reflection points are discrete. Namely, while optical signals with wavelength components within a certain range are reflected at a same reflection point, reflection points change discretely for wavelength components in a different range. It is to be noted that while the pitches of the grating of the multi-section FBG are usually adjusted according to a purpose, pitches of appropriate intervals according to the wavelength of the subject light may be used. For example, 100 nm to 1000 nm can be used, while 300 nm to 800 nm is acceptable. Also, as the difference of refraction index of the grating against the core, $1 \times 10^{-6}$ to $1 \times 10^{-2}$ can be used, while $1 \times 10^{-5}$ to $5 \times 10^{-3}$ and $1 \times 10^{-4}$ to $1 \times 10^{-3}$ are acceptable.

The optical modulation system according to the sixth aspect of the present invention is the optical modulation system above described which further comprises a control part which is connected to a detecting part of an output signal from the Mach-Zehnder waveguide (8), and outputs a control signal to a signal source which controls voltage applied to each electrode, wherein the control part (i) adjusts voltage applied to the first electrode (electrode A) (11), the second electrode (electrode B) (12) and the third electrode (electrode C) (13) so as to increase output from the Mach-Zehnder waveguide (8), (ii) adjusts bias voltage applied to the third electrode (electrode C) (13) so as to decrease output from the Mach-Zehnder waveguide (8), (iii) decreases bias voltage of either one of the sub Mach-Zehnder electrodes so as to decrease output from the Mach-Zehnder waveguide (8), and (iv) adjusts bias voltage applied to the third electrode (electrode C) (13) so as to decrease output from the Mach-Zehnder waveguide (8).

The optical modulation system according to the sixth aspect of the present invention is preferably and automatically capable of obtaining a preferable bias voltage level by a bias modulation method including the steps of:

(i) adjusting voltage applied to the first electrode (electrode A) (11), the second electrode (electrode B) (12) and the third electrode (electrode C) (13) so as to increase output from the Mach-Zehnder waveguide (8), (ii) adjusting bias voltage applied to the third electrode (electrode C) (13) so as to decrease output from the Mach-Zehnder waveguide (8), (iii) decreasing bias voltage of either one of the sub Mach-Zehnder electrodes so as to decrease output from the Mach-Zehnder waveguide (8), and (iv) adjusting bias voltage applied to the third electrode (electrode C) (13) so as to decrease output from the Mach-Zehnder waveguide (8).

By using the bias voltage adjusted in this way, in other words, by using a signal with relatively less carrier components or relatively less high order components, these components are suppressed by the method above explained. Therefore, the components to be suppressed can be suppressed more effectively.

The extinction ratio modulation method of a preferable embodiment of the present invention is explained below. The modulation method of the present invention basically includes the following steps of:

(i) adjusting bias voltage of the main Mach-Zehnder electrode (electrode C) and bias voltage of the two sub Mach-Zehnder electrodes so as to increase output from the main Mach-Zehnder waveguide ($MZ_C$);

(ii) adjusting bias voltage of the electrode C so as to decrease output from the main Mach-Zehnder waveguide ($MZ_C$);

(iii) decreasing bias voltage of either one of the sub Mach-Zehnder electrodes so as to decrease output from the main Mach-Zehnder waveguide ($MZ_C$); and (iv) adjusting bias of the electrode C so as to decrease output from the main Mach-Zehnder waveguide ($MZ_C$).

It is to be noted that repeatedly performing the above step (iii) and the step (iv) is a preferable embodiment of the present invention. Hereinafter, each step is explained.

(i) Step of Adjusting Bias Voltage of the Electrode C and Bias Voltage of the Two Sub Mach-Zehnder Electrodes so as to Increase Output from the Main Mach-Zehnder Waveguide.

This step adjusts bias voltage of the electrode C and bias voltage of two sub Mach-Zehnder electrodes so that output from the main Mach-Zehnder waveguide is increased (preferably as much as possible, more preferably maximized). Since the main MZ waveguide is, for example, connected to a measurement system, the bias voltage applied to the each Mach-Zehnder electrode may be adjusted by observing output levels of the measurement system.

The measurement system may be connected to a power supply system supplying each bias voltage via a control device, and each bias voltage may be controlled so that optical intensity measured by the measurement system is increased. The control device comprises an input part, an output part, a memory part (including memory and main memory), a computing part, wherein the input part inputs information, the output part outputs information, the memory part stores information, and the computing part such as CPU performs arithmetic operations. Information on optical intensity measured by the measurement system is inputted to the control device by the input part, and stored in the memory. The CPU of the control device, based on an order from a controlling program of the main memory, retrieves the information on optical intensity from the memory. Also, the CPU of the control device, based on an order from a controlling program of the main memory, outputs a signal changing bias voltages applied to either one of or two or more of electrodes from the output part. This process changes the intensity level of output light. The control device, retrieving the information and comparing it to the former optical intensity, outputs an order of changing bias voltages so as to increase the optical intensity from the output part. A power source which received this output signal, based on the order, changes voltage levels applied to each electrode, thereby increasing the optical output.

(ii) Step of Adjusting Bias Voltage of Electrode C so as to Decrease Output from the Main Mach-Zehnder Waveguide.

This step adjusts bias voltage applied to the main Mach-Zehnder electrode so that intensity of output light from the main Mach-Zehnder waveguide is decreased. Since the main MZ waveguide is connected to a measurement system not shown in figures, the bias voltage applied to the main Mach-Zehnder electrode may be adjusted by observing output levels of the measurement system.

The measurement system may be connected to a power supply system supplying bias voltage to the main Mach-Zehnder electrode via a control device, and the bias voltage may be controlled so that optical intensity measured by the measurement system is decreased. Information on optical intensity measured by the measurement system is inputted to the control device by the input part, and stored in the memory. The CPU of the control device, based on an order from a controlling program of the main memory, retrieves the information on optical intensity from the memory. Also, the CPU of the control device, based on an order from the controlling program of the main memory, outputs a signal changing bias voltages applied to the main Mach-Zehnder electrode from the output part. This process changes the intensity level of output light. The control device, retrieving the information and comparing it to the former optical intensity, outputs an order of changing bias voltages so as to decrease the optical intensity from the output part. A power source which received this output signal, based on the order, changes voltage levels applied to the main Mach-Zehnder electrode, thereby decreasing the optical output.

(iii) Step of Decreasing Bias Voltage of Either One of the Sub Mach-Zehnder Electrodes so as to Decrease Output from the Main Mach-Zehnder Waveguide.

In this step, bias voltage of either one of the sub Mach-Zehnder electrodes is decreased so that output from the main Mach-Zehnder waveguide is decreased. In this step, if bias voltage of either one of the sub Mach-Zehnder electrodes is decreased, output from the main Mach-Zehnder waveguide will be decreased. Therefore, bias voltage of the sub Mach-Zehnder electrode, to which output from the main Mach-Zehnder waveguide is decreased, is adjusted to be decreased.

In this step, voltage level to be increased or decreased may be predetermined. A range of voltage level change is, for example, from 0.01 V to 0.5V, and is preferably from 0.05V to 0.1V. By this step, output intensity from the main Mach-Zehnder is decreased. Since the main Mach-Zehnder waveguide is connected to a measurement system not shown in figures, the bias voltage may be adjusted by observing output levels of the measurement system.

The measurement system may be connected to a power supply system supplying bias voltage to the electrode A and the electrode B via a control device, and the bias voltage applied to the electrode A or the electrode B may be controlled. In this case, information on an electrode whose voltage level is changed and information on voltage level to be changed may be stored in a memory and the like. The CPU of the control device, based on an order from a controlling program of the main memory, retrieves control information from the memory, and outputs a signal changing bias voltage applied to the electrode A and electrode B. This changes bias voltage applied to the electrode A or the electrode B by a certain amount. And if the bias voltage applied to the electrode A or the electrode B changes by a certain amount, intensity of an optical signal from the main Mach-Zehnder will change. The information on optical intensity observed by the measurement system is inputted from the input part and stored in the memory. The CPU of the control device, based on an order from the controlling program of the main memory retrieves information on optical intensity stored in the memory, outputs an order from the output part. The order is to change bias voltages applied to the sub Mach-Zehnder electrodes so as to decrease optical intensity from the main Mach-Zehnder waveguide. The power source, having received this output signal, changes the voltage level applied to electrodes based on the order, thereby decreasing optical output.

(iv) Step of Adjusting Bias Voltage of the Electrode C so as to Decrease Output of the Main Mach-Zehnder Waveguide.

This step adjusts bias voltage of electrode C so as to decrease output of the main Mach-Zehnder waveguide. Since the main MZ waveguide is connected to a measurement system not shown in figures, for example, the bias voltage may be adjusted by observing output levels of the measurement system. It is to be noted that this step or the above step (iii) and this step may be repeatedly performed.

The measurement system may be connected to a power supply system supplying bias voltage to the electrode C via a control device, and bias voltage applied to the electrode C may be controlled. The CPU of the control device, based on an order from a controlling program of the main memory, retrieves control information from the memory, and outputs a signal changing bias voltage applied to the electrode C from output part. This changes bias voltage applied to the electrode C by a certain amount.

Also, the CPU of the control device, based on an order from a controlling program of the main memory, retrieves control information or information on output light from the memory, and may make a decision to stop adjusting bias voltage. To the contrary, the CPU may keep adjusting bias voltage by feeding back intensity information of an output light from the measurement system.

The optical modulation system according to the seventh embodiment of the present invention comprises: an optical modulator; a circulator (42); a fiber grating (43); a photodetector (44); and a control part (23). An output signal from the optical modulator is inputted to the circulator (42). An output light from the circulator is inputted to the fiber grating (43) which reflects predetermined optical signal components of the optical modulator and transmits the other optical signal components. The photodetector (44) detects the optical signal which has transmitted through the fiber grating. The control part (23) controls a signal (16) based on the optical signal detected by the photodetector. The signal is outputted from the signal source which applies a signal to the optical modulator.

The optical modulation system of this embodiment, in the same way as the optical modulation system according to the fifth embodiment of the present invention, effectively extracts a predetermined optical signal, and, by separating unnecessary optical signal components, controls the signal source system so that the intensity of the unnecessary optical signal components are weakened, thereby decreasing the unnecessary components more effectively.

The optical modulation system according to the seventh aspect of the present invention is the above described optical modulation system which preferably comprises: a Mach-Zehnder waveguide (8) including an input part (2) of an optical signal, a branching part (3) where the optical signal is branched, a first arm (4) which is configured to act as a waveguide, wherein one of the optical signal branched from the branching part (3) propagates though the first arm, a second arm (5) which is configured to act as a waveguide, wherein the remaining optical signal branched from the branching part (3) propagates though the second arm, a combining part (6) which combines the optical signals outputted from the first arm (4) and the second arm (5), and an output part (7) which outputs the optical signal being combined at the combining part (6); a first intensity modulator (9) provided on the first arm (4) wherein the first intensity modulator (9) controls amplitude of the optical signal propagating through the first arm (4); a second intensity modulator (10) provided on the second arm (5) wherein the second intensity modulator (10) controls amplitude of the optical signal propagating through the second arm (5); a first electrode (electrode A) (11) of the first intensity modulator (9); a second electrode (electrode B) (12) of the second intensity modulator (10); a third electrode (electrode C) (13) which controls a phase difference between the optical signals propagating through the first arm (4) and the second arm (5), and to which a modulation signal is applied; and a signal source part (16) which includes a first signal source (14) and a second signal source (high frequency signal source) (15), wherein the first signal source (14) is for supplying bias voltage applied to the first electrode (electrode A) (11), the second electrode (electrode B) (12), and the third electrode (electrode C) (13), and wherein the second signal source (high frequency signal source) (15) is for supplying a radio frequency signal to the third electrode (electrode C) (13).

Operation and structure of the optical modulation system according to the seventh aspect of the present invention are the same as those of the optical modulation system according to the fifth aspect of the present invention.

The optical modulation method by the optical modulator of the present invention realizes high extinction ratio. Therefore the optical modulation method can effectively be used in the field of optical information communication. Also, as shown in operation example 2, the modulation method of the present invention is able to suppress carrier components, thereby effectively realizing the modulation method such as the DSB-SC modulation. Therefore, the optical modulation method can be use in the optical information communication.

What is claimed is:
1. An optical modulation system comprising:
   a Mach-Zehnder waveguide comprising:
      an input part of an optical signal, a branching part where the optical signal is branched, the branching part connecting to the input part, a first arm, the first arm being configured to act as a waveguide, wherein one of the optical signal branched from the branching part propagates though the first arm, a second arm, the second arm being configured to act as a waveguide, wherein the remaining optical signal branched from the branching part propagates though the second arm, a combining part combining the optical signals, the optical signals outputted from the first arm and the second arm, and an output part outputting the optical signal, the optical signal being combined at the combining part;

a first intensity modulator provided on the first arm, the first intensity modulator controlling amplitude of the optical signal propagating through the first arm;

a second intensity modulator provided on the second arm, the second intensity modulator controlling amplitude of the optical signal propagating through the second arm;

a first electrode (electrode A) of the first intensity modulator;

a second electrode (electrode B) of the second intensity modulator;

a first main Mach-Zehnder electrode ($MZ_{CA}$ electrode) provided along at least a part of a waveguide portion between an output part of the first intensity modulator and the combining part;

a second main Mach-Zehnder electrode ($MZ_{CB}$ electrode) provided along at least a part of a waveguide portion between an output part of the second intensity modulator and the combining part, wherein the first intensity modulator is a first Mach-Zehnder waveguide including the first electrode (electrode A), and the second intensity modulator is a second Mach-Zehnder waveguide including the second electrode (electrode B), and a control part for adjusting modulation time of an $RF_A$ signal, an $RF_B$ signal, a modulation signal applied to the first main Mach-Zehnder electrode ($MZ_{CA}$ electrode), and a modulation signal applied to the second main Mach-Zehnder electrode ($MZ_{CB}$ electrode), wherein the $RF_A$ signal is a radio frequency signal applied to the optical signal, the optical signal propagating through two arms composing the first sub Mach-Zehnder waveguide ($MZ_A$), and wherein the $RF_B$ signal is a radio frequency signal applied to the optical signal, the optical signal propagating through two arms composing the second sub Mach-Zehnder waveguide ($MZ_B$).

2. The optical modulation system as claimed in claim 1, wherein the optical modulator acts as an optical carrier suppressed double side band modulator (DSB-SC modulator).

3. An optical modulation system comprising:

a Mach-Zehnder waveguide comprising:
  an input part of an optical signal,
  a branching part where the optical signal is branched, the branching part connecting to the input part,
  a first arm, the first arm being configured to act as a waveguide, wherein one of the optical signal branched from the branching part propagates though the first arm,
  a second arm, the second arm being configured to act as a waveguide, wherein the remaining optical signal branched from the branching part propagates though the second arm,
  a combining part combining the optical signals, the optical signals outputted from the first arm and the second arm, and
  an output part outputting the optical signal, the optical signal being combined at the combining part;

a first intensity modulator provided on the first arm, the first intensity modulator controlling amplitude of the optical signal propagating through the first arm;

a second intensity modulator provided on the second arm, the second intensity modulator controlling amplitude of the optical signal propagating through the second arm;

a first electrode (electrode A) of the first intensity modulator;

a second electrode (electrode B) of the second intensity modulator;

a first main Mach-Zehnder electrode ($MZ_{CA}$ electrode) provided along at least a part of a waveguide portion between an output part of the first intensity modulator and the combining part;

a second main Mach-Zehnder electrode ($MZ_{CB}$ electrode) provided along at least a part of a waveguide portion between an output part of the second intensity modulator and the combining part; and a control part for adjusting voltage applied to the first main Mach-Zehnder electrode ($MZ_{CA}$ electrode) and the second main Mach-Zehnder electrode ($MZ_{CB}$ electrode), the voltage being adjusted so that phase difference of optical carrier signals or certain high order optical signals become 180 degrees, the optical carrier signals or the certain high order optical signals being contained in output signals from the first intensity modulator and output signals from the second intensity modulator.

4. An optical modulation system comprising:

a Mach-Zehnder waveguide comprising:
  an input part of an optical signal,
  a branching part where the optical signal is branched, the branching part connecting to the input part,
  a first arm, the first arm being configured to act as a waveguide, wherein one of the optical signal branched from the branching part propagates though the first arm,
  a second arm, the second arm being configured to act as a waveguide, wherein the remaining optical signal branched from the branching part propagates though the second arm,
  a combining part combining the optical signals, the optical signals outputted from the first arm and the second arm, and
  an output part outputting the optical signal, the optical signal being combined at the combining part;

a first intensity modulator provided on the first arm, the first intensity modulator controlling amplitude of the optical signal propagating through the first arm;

a second intensity modulator provided on the second arm, the second intensity modulator controlling amplitude of the optical signal propagating through the second arm;

a first electrode (electrode A) of the first intensity modulator;

a second electrode (electrode B) of the second intensity modulator;

a first main Mach-Zehnder electrode (MZ$_{CA}$ electrode) provided along at least a part of a waveguide portion between an output part of the first intensity modulator and the combining part;
a second main Mach-Zehnder electrode (MZ$_{CB}$ electrode) provided along at least a part of a waveguide portion between an output part of the second intensity modulator and the combining part; and
a signal source part comprising:
  the first electrode (electrode A);
  the second electrode (electrode B);
  a first signal source for supplying bias voltage, the bias voltage being applied to the MZ$_{CA}$ electrode and the MZ$_{CB}$ electrode; and
  a second signal source (high frequency signal source) for supplying a radio frequency signal to the MZ$_{CA}$ electrode and the MZ$_{CB}$ electrode,
  wherein the second signal source (high frequency signal source) comprises:
    a third harmonic signal generator for generating an electric signal ($3f_m$) whose frequency is three times the frequency of a basic signal ($f_m$);
    a phase adjusting part for adjusting a phase difference between a phase of the basic signal ($f_m$) and a phase of the electric signal ($3f_m$), the basic signal ($f_m$) being outputted from the second signal source (high frequency signal source), the electric signal ($3f_m$) being outputted from the third harmonic signal generator, the electric signal ($3f_m$) having frequency three times the frequency of the basic signal ($f_m$); and
    a signal intensity adjusting part for adjusting intensity of the basic signal ($f_m$) or the electric signal ($3f_m$), the basic signal ($f_m$) being outputted from the second signal source (high frequency signal source), the electric signal ($3f_m$) being generated from the third harmonic signal generator, the electric signal ($3f_m$) having a frequency three times the frequency of the basic signal ($f_m$).

5. An optical modulation system comprising:
a Mach-Zehnder waveguide comprising:
  an input part of an optical signal,
  a branching part where the optical signal is branched, the branching part connecting to the input part,
  a first arm, the first arm being configured to act as a waveguide, wherein one of the optical signal branched from the branching part propagates though the first arm,
  a second arm, the second arm being configured to act as a waveguide, wherein the remaining optical signal branched from the branching part propagates though the second arm,
  a combining part combining the optical signals, the optical signals outputted from the first arm and the second arm, and
  an output part outputting the optical signal, the optical signal being combined at the combining part;
a first intensity modulator provided on the first arm, the first intensity modulator controlling amplitude of the optical signal propagating through the first arm;
a second intensity modulator provided on the second arm, the second intensity modulator controlling amplitude of the optical signal propagating through the second arm;
a first electrode (electrode A) of the first intensity modulator;
a second electrode (electrode B) of the second intensity modulator;
a first main Mach-Zehnder electrode (MZ$_{CA}$ electrode) provided along at least a part of a wave guide portion between an output part of the first intensity modulator and the combining part;
a second main Mach-Zehnder electrode (MZ$_{CB}$ electrode) provided along at least a part of a waveguide portion between an output part of the second intensity modulator and the combining part; and
either one or both of an optical intensity compensation mechanism and an optical intensity compensation mechanism, the optical intensity compensation mechanism being provided along the first arm between the first intensity modulator and the combining part, the optical intensity compensation mechanism being provided along the second arm between the second intensity modulator and the combing part.

6. An optical modulation system comprising:
a Mach-Zehnder waveguide comprising:
  an input part of an optical signal,
  a branching part where the optical signal is branched, the branching part connecting to the input part,
  a first arm, the first arm being configured to act as a waveguide, wherein one of the optical signal branched from the branching part propagates though the first arm,
  a second arm, the second arm being configured to act as a waveguide, wherein the remaining optical signal branched from the branching part propagates though the second arm,
  a combining part combining the optical signals, the optical signals outputted from the first arm and the second arm, and
  an output part outputting the optical signal, the optical signal being combined at the combining part;
a first intensity modulator provided on the first arm, the first intensity modulator controlling amplitude of the optical signal propagating through the first arm;
a second intensity modulator provided on the second arm, the second intensity modulator controlling amplitude of the optical signal propagating through the second arm;
a first electrode (electrode A) of the first intensity modulator;
a second electrode (electrode B) of the second intensity modulator;
a first main Mach-Zehnder electrode (MZ$_{CA}$ electrode) provided along at least a part of a waveguide portion between an output part of the first intensity modulator and the combining part;
a second main Mach-Zehnder electrode (MZ$_{CB}$ electrode) provided along at least a part of a waveguide portion between an output part of the second intensity modulator and the combining part;
either one or both of a phase modulator and an intensity modulator for modulating output light from the optical modulator or input light to the optical modulator; and
a control part for controlling modulation time of a modulation signal of the optical modulator and a modulation signal of the phase modulator or the intensity modulator,
wherein the control part controls that the phase modulator or the intensity modulator modulates either one or both of double side band signals of an output signal from the optical modulator or input light to the optical modulator so that a frequency of either one of the double side band signals outputted from the optical modulator becomes equal to a frequency of an optical carrier signal or a high order optical signal of output light from the optical modulator, thereby the optical carrier signal or the high order optical signal being cancelled, and wherein the optical modulation system acting as an optical modulator.

7. An optical modulation system comprising:

a Mach-Zehnder waveguide comprising:
   an input part of an optical signal,
   a branching part where the optical signal is branched, the branching part connecting to the input part,
   a first arm, the first arm being configured to act as a waveguide, wherein one of the optical signal branched from the branching part propagates though the first arm,
   a second arm, the second arm being configured to act as a waveguide, wherein the remaining optical signal branched from the branching part propagates though the second arm,
   a combining part combining the optical signals, the optical signals outputted from the first arm and the second arm, and
   an output part outputting the optical signal, the optical signal being combined at the combining part;

a first intensity modulator provided on the first arm, the first intensity modulator controlling amplitude of the optical signal propagating through the first arm;

a second intensity modulator provided on the second arm, the second intensity modulator controlling amplitude of the optical signal propagating through the second arm;

a first electrode (electrode A) of the first intensity modulator;

a second electrode (electrode B) of the second intensity modulator;

a first main Mach-Zehnder electrode ($MZ_{CA}$ electrode) provided along at least a part of a waveguide portion between an output part of the first intensity modulator and the combining part;

a second main Mach-Zehnder electrode ($MZ_{CB}$ electrode) provided along at least a part of a waveguide portion between an output part of the second intensity modulator and the combining part; and a control part being connected to a detecting part of an output signal from the Mach-Zehnder waveguide, the control part outputting a control signal to a signal source, the control signal controlling voltage applied to each electrode, wherein the control part
(i) adjusts voltage applied to the first electrode (electrode A), the second electrode (electrode B), the $MZ_{CA}$ electrode, and the $MZ_{CB}$ electrode so as to increase output from the Mach-Zehnder waveguide,
(ii) adjusts bias voltage applied to the $MZ_{CA}$ electrode and the $MZ_{CB}$ electrode so as to decrease output from the Mach-Zehnder waveguide,
(iii) decreases bias voltage of either one of the sub Mach-Zehnder electrodes so as to decrease output from the Mach-Zehnder waveguide, and
(iv) adjusts bias voltage applied to the $MZ_{CA}$ electrode and the $MZ_{CB}$ electrode so as to decrease output from the Mach-Zehnder waveguide.

8. An optical modulation method for adjusting bias voltage applied to each Mach-Zehnder waveguide by using the optical modulation system as claimed in claim 7, the optical modulation method comprising the steps of:
(i) adjusting bias voltage applied to the main Mach-Zehnder waveguide ($MZ_C$) and bias voltage applied to the first sub Mach-Zehnder waveguide ($MZ_A$) and the second Mach-Zehnder waveguide ($MZ_B$) so as to increase output from the main Mach-Zehnder waveguide ($MZ_C$);
(ii) adjusting bias voltage applied to the main Mach-Zehnder waveguide ($MZ_C$) so as to decrease output from the main Mach-Zehnder waveguide ($MZ_C$);
(iii) decreasing bias voltage of the first sub Mach-Zehnder waveguide ($MZ_A$) or the second sub Mach-Zehnder waveguide ($MZ_B$) so as to decrease output from the main Mach-Zehnder waveguide ($MZ_C$); and
(iv) adjusting bias voltage applied to the main Mach-Zehnder waveguide ($MZ_C$) so as to decrease output from the main Mach-Zehnder waveguide ($MZ_C$).

9. An optical modulation system comprising:

a Mach-Zehnder waveguide comprising:
   an input part of an optical signal,
   a branching part where the optical signal is branched, the branching part connecting to the input part,
   a first arm, the first arm being configured to act as a waveguide, wherein one of the optical signal branched from the branching part propagates though the first arm,
   a second arm, the second arm being configured to act as a waveguide, wherein the remaining optical signal branched from the branching part propagates though the second arm,
   a combining part combining the optical signals, the optical signals outputted from the first arm and the second arm, and
   an output part outputting the optical signal, the optical signal being combined at the combining part;

a first intensity modulator provided on the first arm, the first intensity modulator controlling amplitude of the optical signal propagating through the first arm;

a second intensity modulator provided on the second arm, the second intensity modulator controlling amplitude of the optical signal propagating through the second arm;

a first electrode (electrode A) of the first intensity modulator;

a second electrode (electrode B) of the second intensity modulator;

a first main Mach-Zehnder electrode ($MZ_{CA}$ electrode) provided along at least a part of a waveguide portion between an output part of the first intensity modulator and the combining part;

a second main Mach-Zehnder electrode ($MZ_{CB}$ electrode) provided along at least a part of a waveguide portion between an output part of the second intensity modulator and the combining part;

a circulator wherein the optical signal is inputted, the optical signal having been combined at the combining part;

a fiber grating wherein an output light from the circulator is inputted, wherein the optical modulation system is an optical carrier suppressed double side band (DSB-SC) modulation system; and a control part being connected to a detecting part of an output signal from the Mach-Zehnder waveguide, the control part outputting a control signal to a signal source, the control signal controlling voltage applied to each electrode, wherein the control part:
(i) adjusts voltage applied to the first electrode (electrode A), the second electrode (electrode B), the $MZ_{CA}$ electrode, and the $MZ_{CB}$ electrode so as to increase output from the Mach-Zehnder waveguide, (ii) adjusts bias voltage applied to the $MZ_{CA}$ electrode and the $MZ_{CB}$ electrode so as to decrease output from the Mach-Zehnder waveguide,
(iii) decreases bias voltage of either one of the sub Mach-Zehnder electrodes so as to decrease output from the Mach-Zehnder waveguide, and
(iv) adjusts bias voltage applied to the MZCA electrode and the MZCB electrode so as to decrease output from the Mach-Zehnder waveguide.

10. An optical modulation method for adjusting bias voltage applied to each Mach-Zehnder waveguide by using the optical modulation system as claimed in claim 9, the optical modulation method comprising the steps of:
(i) adjusting bias voltage applied to the main Mach-Zehnder waveguide ($MZ_C$) and bias voltage applied to the first sub Mach-Zehnder waveguide ($MZ_A$) and the second Mach-Zehnder waveguide ($MZ_B$) so as to increase output from the main Mach-Zehnder waveguide ($MZ_C$);
(ii) adjusting bias voltage applied to the main Mach-Zehnder waveguide ($MZ_C$) so as to decrease output from the main Mach-Zehnder waveguide ($MZ_C$);
(iii) decreasing bias voltage of the first sub Mach-Zehnder waveguide ($MZ_A$) or the second sub Mach-Zehnder waveguide ($MZ_B$) so as to decrease output from the main Mach-Zehnder waveguide ($MZ_C$); and
(iv) adjusting bias voltage applied to the main Mach-Zehnder waveguide ($MZ_C$) so as to decrease output from the main Mach-Zehnder waveguide ($MZ_C$).

* * * * *